US 7,466,566 B2

(12) United States Patent  (10) Patent No.: US 7,466,566 B2
Fukumoto  (45) Date of Patent: Dec. 16, 2008

(54) DC-AC CONVERTER, CONTROLLER IC THEREFOR, AND ELECTRONIC APPARATUS UTILIZING SUCH DC-AC CONVERTER

(75) Inventor: Kenichi Fukumoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 194 days.

(21) Appl. No.: 10/597,705

(22) PCT Filed: Mar. 2, 2005

(86) PCT No.: PCT/JP2005/004018

§ 371 (c)(1),
(2), (4) Date: Aug. 4, 2006

(87) PCT Pub. No.: WO2005/086336

PCT Pub. Date: Sep. 15, 2005

(65) Prior Publication Data

US 2007/0171684 A1  Jul. 26, 2007

(30) Foreign Application Priority Data

Mar. 5, 2004  (JP) .............................. 2004-061709

(51) Int. Cl.
  *H02M 3/335* (2006.01)
  *H02M 3/24* (2006.01)
  *H02M 7/5387* (2007.01)
(52) U.S. Cl. .................... 363/17; 363/56.02; 363/98; 363/132
(58) Field of Classification Search ................. 363/16, 363/17, 56.01, 56.02, 97, 98, 131, 132
See application file for complete search history.

(56) References Cited

U.S. PATENT DOCUMENTS 5,946,200 A * 8/1999 Kim et al. ..................... 363/17

(Continued)

FOREIGN PATENT DOCUMENTS

JP  07-302688 A  11/1995

(Continued)

OTHER PUBLICATIONS

International Search Report issued in the corresponding International Application No. PCT/JP2005/004018, mailed on May 24, 2005.

*Primary Examiner*—Matthew V Nguyen
(74) *Attorney, Agent, or Firm*—Keating & Bennett, LLP

(57) ABSTRACT

An inverter has a semiconductor switch circuit provided in the primary circuit of a transformer. The switch circuit is controlled by a PWM circuit. The switch circuit is operated on the basis of an intermittent-operation signal having an ON state and OFF state to: set an error signal to a substantially zero level during OFF periods; gradually increase the error signal upon transition from an OFF state to an ON state; and gradually decrease the error signal upon transition from an ON state to an OFF state. Each ON phase of the intermittent operation is slowly started and slowly ended through charging and discharging of a capacitor provided in a feedback circuit. This enables concomitant application of constant-current control and intermittent-operation control to the inverter, which in turn provides a broad range of power that can be supplied to a load, significantly reduces hamming of the transformer, and prevents over-current from occurring in the inverter.

16 Claims, 11 Drawing Sheets

U.S. PATENT DOCUMENTS

| | | | |
|---|---|---|---|
| 6,038,142 A * | 3/2000 | Fraidlin et al. | 363/17 |
| 6,114,814 A | 9/2000 | Shannon et al. | |
| 6,259,615 B1 * | 7/2001 | Lin | 363/98 |
| 6,316,881 B1 | 11/2001 | Shannon et al. | |
| 6,356,462 B1 * | 3/2002 | Jang et al. | 363/17 |
| 6,927,989 B2 * | 8/2005 | Fukumoto | 363/95 |
| 6,982,886 B2 * | 1/2006 | Fukumoto | 363/72 |
| 6,982,889 B2 * | 1/2006 | Fukumoto | 363/98 |
| 6,992,902 B2 * | 1/2006 | Jang et al. | 363/17 |
| 7,046,532 B2 * | 5/2006 | Matsuo et al. | 363/65 |
| 7,095,632 B2 * | 8/2006 | Fukumoto | 363/17 |
| 7,099,168 B2 * | 8/2006 | Fukumoto | 363/98 |
| 7,126,831 B2 * | 10/2006 | Toda et al. | 363/26 |
| 7,136,294 B2 * | 11/2006 | Phadke et al. | 363/132 |
| 7,248,488 B2 * | 7/2007 | Toda et al. | 363/26 |
| 7,292,463 B2 * | 11/2007 | Fukumoto | 363/98 |
| 2002/0047601 A1 | 4/2002 | Shannon et al. | |
| 2002/0171376 A1 | 11/2002 | Rust et al. | |
| 2003/0161164 A1 | 8/2003 | Shannon et al. | |
| 2004/0155607 A1 | 8/2004 | Rust et al. | |
| 2004/0240234 A1 * | 12/2004 | Toda et al. | 363/22 |
| 2005/0007794 A1 * | 1/2005 | Fukumoto | 363/16 |
| 2005/0219863 A1 * | 10/2005 | Fukumoto et al. | 363/16 |
| 2007/0279946 A1 * | 12/2007 | Toda et al. | 363/26 |
| 2007/0285955 A1 * | 12/2007 | Fukumoto | 363/72 |
| 2008/0037291 A1 * | 2/2008 | Fukumoto | 363/17 |

FOREIGN PATENT DOCUMENTS

| | | |
|---|---|---|
| JP | 10-050489 A | 2/1998 |
| JP | 2002-221701 | 8/2002 |
| JP | 2004-55538 A | 2/2004 |
| JP | 2002-233158 A | 8/2006 |

\* cited by examiner

DC-AC CONVERTER, CONTROLLER IC THEREFOR, AND ELECTRONIC APPARATUS UTILIZING SUCH DC-AC CONVERTER

TECHNICAL FIELD

This invention relates to a DC-AC converter (hereinafter referred to as inverter) for generating an AC voltage for driving a load from a DC power source such as a power supply adapter of an electric apparatus and a battery, a controller IC for such inverter, and an electronic apparatus utilizing such inverter.

BACKGROUND ART

A cold cathode fluorescent light (CCFL) has been increasingly used as a back light source of a liquid crystal display (LCD) of, for example, a notebook PC and a TV set. Such CCFL has substantially the same high efficiency and life as a usual hot cathode fluorescent light, without using a filament of a hot cathode fluorescent light.

In order to start up and operate the CCFL, high AC voltages are required. For example, a startup voltage of about 1000 V and an operating voltage of about 600 V (in rms value) are required. (The voltages will be hereinafter given in rms value.) These high AC voltages are generated from a DC power source provided in, for example, a notebook PC and a liquid crystal TV set, using an inverter.

An inverter for supplying AC power to a CCFL, configured to attain high power conversion efficiency is disclosed in Japanese Patent Application Laid Open No. 10-50489 (referred to as Patent Document 1). This inverter has a first semiconductor switch connected in series with the primary winding of a transformer, a second semiconductor switch and a capacitor which are connected in series to each other and connected in parallel with the primary winding of the transformer, and a coupling capacitor connected in series with a load and with the secondary winding of the transformer. The primary current of the transformer is fed back to a control circuit where the voltage indicative of the current is compared with a reference voltage to form a control signal for performing on-off control of the first and second semiconductor switches to thereby supply required AC power to the load.

A full bridge (or H-bridge) type inverter for CCFL that utilizes four semiconductor switches is disclosed in Japanese Patent Application Laid Open No. 2002-233158 (referred to as Patent Document 2). This inverter includes a transformer having a primary winding connected in series with the output end of an H-bridge, and a secondary winding to be connected to a load. Of the four semiconductor switches constituting the H-bridge, a first set of two semiconductor switches establishes a current path through the primary winding in a first direction, while a second set of two semiconductor switches establishes a current path through the primary winding in a second direction. The inverter generates a control signal consisting of pulses having a fixed pulse width and controlled relative pulse positions by feeding back the current flowing through the secondary winding to a control circuit for comparison with a reference voltage. The control signal controls the semiconductor switches of the H-bridge to regulate the power supplied to the load. The secondary voltage of the transformer is detected to protect the transformer from an over-voltage.

Another inverter for providing power to a CCFL is also disclosed in Japanese Patent Application 2002-221701 (referred to as Patent Document 3). This inverter has a power supply unit that undergoes controlled intermittent operation, wherein the ratio of the ON- to OFF-duty periods of the intermittent operation is regulated by pulse-width modulation (PWM) based on a detection signal indicative of the current flowing through the CCFL so as to maintain the current at a predetermined level.

In the inverter of Patent Documents 1 and 2, the ON duty periods (conduction period) of the semiconductor switches are controlled so as to maintain the load current at the predetermined level. To reduce power supplied to the load, the widths of the control pulses switching on the semiconductor switches may be reduced. However, there is a limitation in the reduction of the pulse widths to provide small power to the load in a stable condition. Hence, it is difficult to downwardly extend the lower limit of dimmer control of the load in the form of a CCFL.

Moreover, it is difficult to perform fine dimmer control using the inverter of Patent Document 3, since the inverter controls only the ON-OFF ratio of the duty periods. The inverter has a further problem in that it requires a complex slow-start arrangement to suppress hamming of the transformer and overhooting of the output current caused by the intermittent operation.

It is, therefore, an object of the invention to provide an inverter comprising a transformer having a primary winding connected to a semiconductor switch circuit and a secondary winding connected to a load, the inverter being capable of supplying a wide range of power to the load via the switch circuit undergoing intermittent operation controlled by pulse width modulation (PWM) for constant-current operation; and making a slow start at the time of startup and at each phase of the intermittent operation by means of a simple circuit arrangement, thereby considerably reducing hamming of the transformer while preventing overcurrent to the load.

It is another object of the invention to provide a controller IC for use with such inverter stated above.

It is still another object of the invention to provide an electronic device equipped with such an inverter as stated above and a light emitting device driven by the inverter.

DISCLOSURE OF THE INVENTION

The inverter of the invention may comprise:

a transformer having a primary winding and at least one secondary winding;

a first and a second semiconductor switches connected in series via the primary winding for allowing current to flow from a DC power source through the primary winding in a first direction;

a third and a fourth semiconductor switches connected in series via the primary winding for allowing current to flow from the DC power source through the primary winding in a second direction;

a current detection circuit for detecting the current that flows through a load connected to the secondary winding to thereby generate a current detection signal;

a triangular wave signal generation circuit for generating a triangular wave signal;

a PWM control signal generation circuit for generating a PWM control signal by comparing the triangular wave signal with an error signal generated on the basis of the current detection signal;

a circuit for performing a controlled intermittent operation on the basis of an intermittent-operation signal having an ON state and OFF state (the circuit hereinafter referred to as intermittent-operation control circuit) adapted to set the error signal to a substantially zero level during an OFF period of the intermittent operation, gradually increase the error signal upon transition from an OFF state to an ON state; and gradually decrease the error signal upon transition from an ON state to an OFF state, and a logic circuit that operates on the basis of the PWM control signal to generate a first switch signal for turning on the first semiconductor switch;

a second switch signal for turning on the second semiconductor switch;

a third switch signal for turning on the third semiconductor switch; and a fourth switch signal for turning on the fourth switch in such a way that a first simultaneous OFF period is established during which the first and fourth switches are simultaneously turned off, and a second simultaneous OFF period is established during which the third and second switches are simultaneously turned off, and that the direction of the current flowing through the primary winding is changed from one direction to the other when the magnitude of the current is zero.

A control IC of the invention may be configured to supply AC power to a load connected to a secondary winding of a transformer by driving a switch circuit that includes: a first and a second semiconductor switches connected in series via the primary winding of the transformer to cause current to flow from a DC power source through the primary winding in a first direction; and a third and a fourth semiconductor switches connected in series via the primary winding to cause current to flow from the DC power source through the primary winding in a second direction, the control IC comprising:

a triangular wave signal generation circuit for generating a triangular wave signal;

a PWM control signal generation circuit for generating a PWM control signal by comparing the triangular wave signal with an error signal formed on the basis of a current detection signal for the current flowing through the load;

an intermittent-operation control circuit adapted to set the error signal to a substantially zero level during an OFF period of the intermittent operation, gradually increase the error signal upon transition from an OFF state to an ON state, and gradually decrease the error signal upon transition from an ON state to an OFF state; and a logic circuit (hereinafter referred to as switch signal generation logic circuit) that operates on the basis of the PWM control signal to generate a first, a second, a third, and a fourth switch signals for respectively turning on the first, second, third, and fourth semiconductor switches in such a way that a first simultaneous OFF period is established during which the first and fourth switches are simultaneously turned off and a second simultaneous OFF period is established during which the third and second switches are simultaneously turned off, and that the direction of the current flowing through the primary winding is switched from one direction to the other when the magnitude of the current is zero.

The logic circuit may be configured such that the second switch is turned on at the point of time matched with every other apex of the triangular wave signal on one side thereof and remains turned on until a triangular signal that follows immediately after the turning on of the second switch becomes equal in magnitude to the error signal;

the first switch is turned on a first predetermined time before the second switch is turned on and remains turned on until a triangular signal that follows immediately after the turning off of the second switch reaches its apex on the other side of the triangular wave signal;

the fourth switch is turned on at the point of time matched with every other apex that is on the same one side of, but is different from, the apices associated with the turning on of the second switch, and remains turned on until a triangular signal that follows immediately after the turning on of the fourth switch becomes equal in magnitude to the error signal; and the third switch is turned on a second predetermined time before the fourth switch is turned on while the second switch is turned off and the first switch is turned on, and remains turned on until a triangular signal that follows immediately after the turning off of the fourth switch reaches its apex on the other side of the triangular wave signal.

The inverter of the invention may comprise:

a transformer having a primary winding and at least one secondary winding;

a first capacitor and a first semiconductor switch connected in series via the primary winding for allowing current to flow from a DC power source through the primary winding in a first direction;

a second semiconductor switch and a second capacitor connected in series via the primary winding for allowing current to flow from the DC power source through the primary winding in a second direction;

a current detection circuit for detecting the current that flows through a load connected to the secondary winding to thereby generate a current detection signal;

a triangular wave signal generation circuit for generating a triangular wave signal;

a PWM control signal generation circuit for generating a PWM control signal by comparing the triangular wave signal with an error signal generated on the basis of the current detection signal;

an intermittent-operation control circuit adapted to set the error signal to a substantially zero level during OFF periods of the intermittent operation, gradually increase the error signal upon a transition from an OFF state to an ON state; and gradually decrease the error signal upon a transition from an ON state to an OFF state, and a logic circuit that operates on the basis of the PWM control signal to generate a first switch signal for turning on the first semiconductor switch and a second switch signal for turning on the second semiconductor switch in such a way that a simultaneously OFF period is established during which the first and second switches are simultaneously turned off, and the direction of the current flowing through the primary winding is changed from one direction to the other when the magnitude of the current is zero.

The controller IC of the invention may be configured to supply AC power to a load connected to a secondary winding of a transformer by driving a switch circuit that includes:

a first capacitor and a first semiconductor switch connected in series via the primary winding of the transformer to cause current to flow from a DC power source through the primary winding in a first direction; and a second semiconductor switch and a second capacitor connected in series via the primary winding to cause current to flow from the DC power source through the primary winding in a second direction, the control IC comprising:

a triangular wave signal generation circuit for generating a triangular wave signal, a PWM control signal generation circuit for generating a PWM control signal by comparing the triangular wave signal with an error signal formed on the basis of a current detection signal for the current flowing through the load;

an intermittent-operation control circuit adapted to
set the error signal to a substantially zero level during an OFF period of the intermittent operation,
gradually increase the error signal upon transition from an OFF state to an ON state, and
gradually decrease the error signal upon transition from an ON state to an OFF state; and a switch signal generation logic circuit that operates on the basis of the PWM control signal to generate a first switch signal for turning on the first semiconductor switch and a second switch signal for turning on the second semiconductor switch in such a way that a simultaneously OFF period is established during which the first and second switches are simultaneously turned off and that the direction of the current flowing through the primary winding is switched from one direction to the other when the magnitude of the current is zero.

The first switch may be turned on at the point of time matched with every other apex of the triangular wave signal on one side of the triangular wave signal and remains turned on until a triangular signal that follows immediately after the turning on of the first switch becomes equal in magnitude to the error signal, and the second switch may be turned on at the point of time matched with every other apex that is on the same one side of, but is different from, the apices associated with the turning on of the second switch, and remains turned on until a triangular signal that follows immediately after the turning on of the fourth switch becomes equal in magnitude to the error signal.

The PWM control signal generation circuit includes
an error signal generation circuit for generating an error signal based on the difference between the current detection signal and a current reference signal, and
a PWM comparator for comparing the triangular wave signal with the error signal to output a PWM control signal, and
the intermittent-operation control circuit has an intermittent-operation control element that is connected to the error signal generation circuit and controllably turned on/off by the intermittent-operation signal in such a way that the error signal has a substantially zero level during off periods of the intermittent operation.

The error signal generation circuit may be configured to generate the error signal based on the error output of an error amplifier that compares the current detection signal with the current reference signal. The intermittent-operation control circuit may be configured to set the current detection signal to a predetermined level to reduce the error signal to a substantially zero level.

A capacitor may be connected between the output end of the error signal generation circuit and the current detection signal input end of the error amplifier, so that the capacitor is discharged upon transition from an ON state to an OFF state of the intermittent-operation signal to reduce the error signal towards zero level, and charged upon transition from an OFF state to an ON state of the intermittent-operation signal to increase the level of the error signal.

An electronic apparatus of the invention is equipped with a DC power source, an inventive inverter adapted to generate an AC output power from the DC voltage of the DC power source, and a light emitting device driven by the AC output of the inverter. The light emitting device may be a CCFL.

In accordance with the invention, the inverter generating an AC voltage for driving a load from a DC power source includes a transformer having a secondary winding connected to a load and a primary winding connected to a circuit that contains semiconductor switches that form a full-bridge type or half-bridge type semiconductor switch circuit such that the switches are controlled through PWM of the drive signal therefor based on the feedback of the load current and in addition through intermittent operation of the switches, thereby enabling provision of a wider range of well controlled output power to the load.

Accordingly, the error signal of the PWM control undergoes a "slow end" in which the error signal gradually decreases upon a transition to an OFF state, and a "slow start" in which the error signal gradually increases upon a transition to an ON state. Thus, not only hamming due to intermittent operation of the transformer can be significantly reduced but also generation of over-current can be prevented. Particularly, since hamming is reduced, the inverter is suitable for use in a backlight source for a liquid crystal display of an electronic apparatus such as a liquid crystal television set and a notebook PC that also provide sound information.

Since the slow start and the slow end of an intermittent operation are carried out through charging and discharging of the capacitor of a feedback circuit, they can be set to last an arbitrarily short period of time, independently of the slow start at the startup of the inverter. Since the period can be regulated by a choice of the capacitance of the capacitor, in harmony with the transformer used, it is easy to reduce its hamming to an adequate level suited for the electronic apparatus utilizing an inverter of the invention.

It is noted that the positive-negative symmetry of the CCFL current is well maintained even when the current is small owing to the inventive PWM scheme of the inverter in all phases of intermittent operation, including rises and falls thereof, which scheme can suppress reduction of CCFL life when it works in cooperation with an over-current prevention scheme.

It is recalled that the error signal is reduced to a substantially zero level in order to perfectly nullify the output current during each OFF period of intermittent operation. It will be appreciated that this eliminates conventional one-side lamp lighting phenomenon (peak discharging phenomenon) that takes place when the pulse width of the PWM control signals is decreased to turn off an inverter. Thus, decrease in lamp life caused by one-side lamp lighting phenomenon can be also prevented by the invention

BEST MODE FOR CARRYING OUT THE INVENTION

Referring to the accompanying drawings, an inverter for converting the DC voltage of a DC power source into an AC voltage for driving a load such as a CCFL in accordance with the invention, a controller IC for controlling the inverter, and an electronic apparatus (e.g. a personal computer and a television set) equipped with a liquid crystal display utilizing the inverter will now be described in detail.

Figure 1:
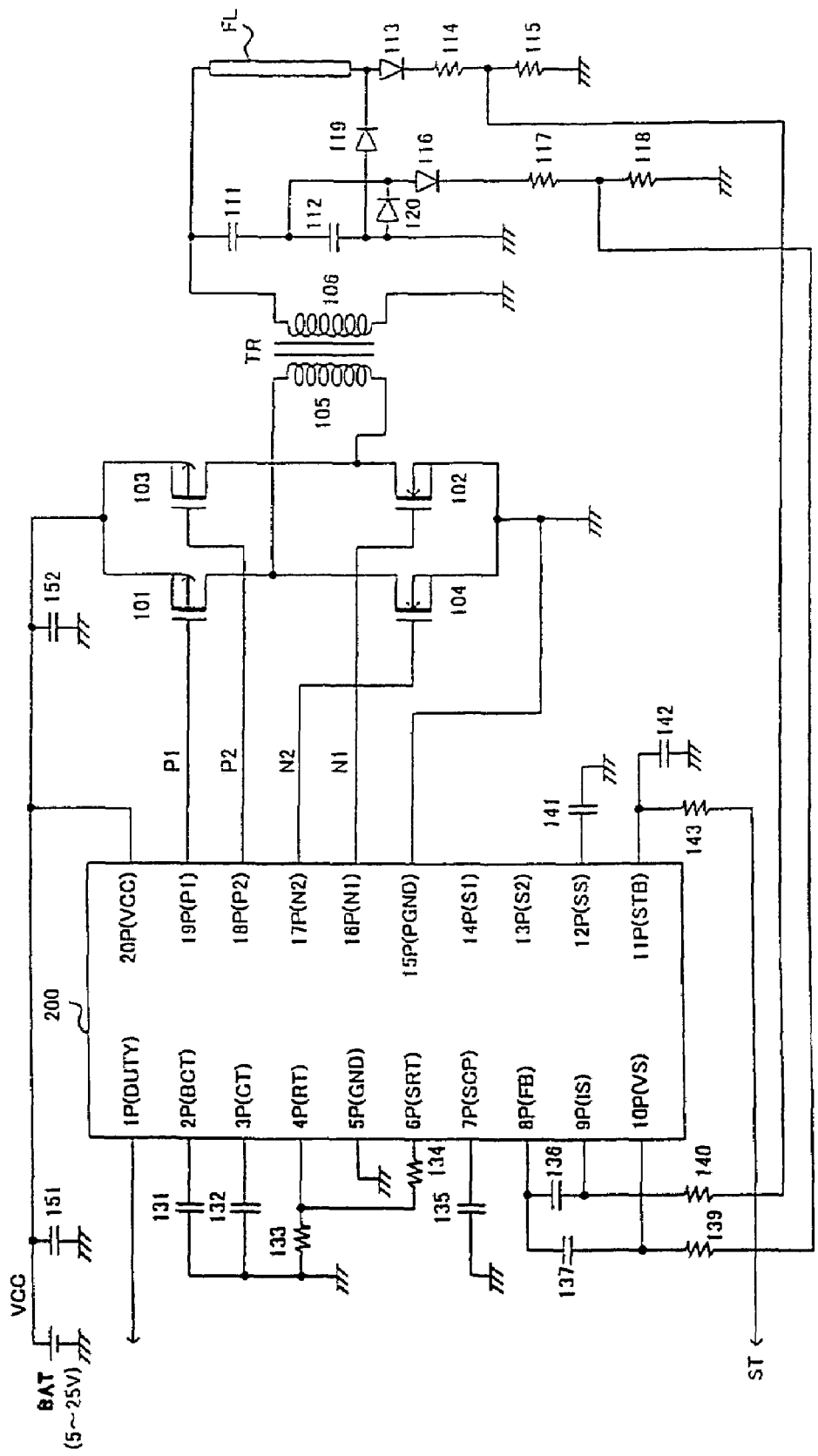
FIG. 1 shows an overall arrangement of an inverter in accordance with a first embodiment of the invention.
Figure 2:
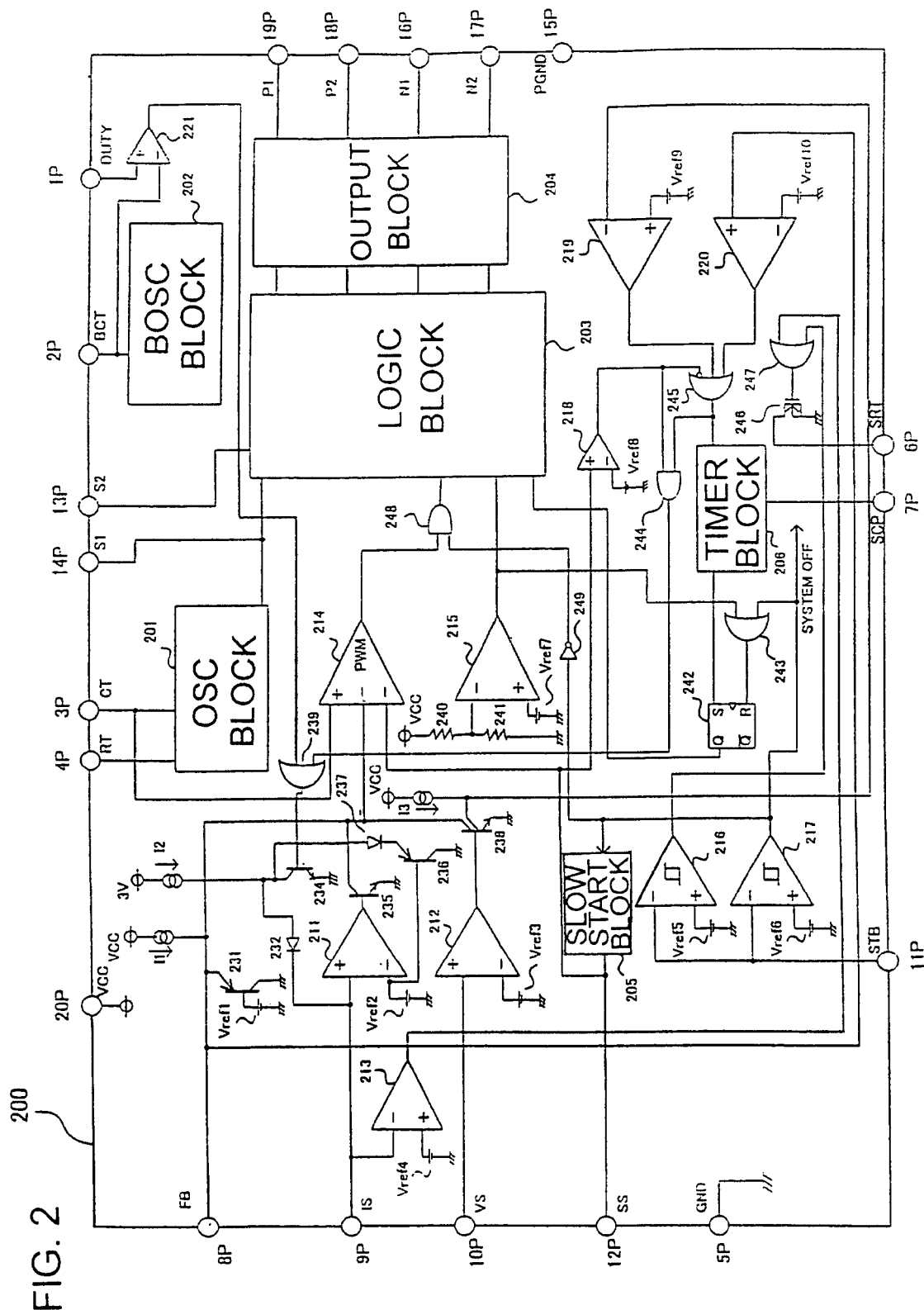
FIG. 2 shows an internal structure of a controller IC of FIG. 1.

Referring to FIG. 1, there is shown an overall arrangement of an inverter that includes an insulated transformer TR and a full-bridge (or H-bridge) switch circuit, the inverter adapted to perform PWM control of the intermittent operation of the switch circuit in accordance with the first embodiment of the invention. FIG. 2 shows an internal structure of a controller IC 200 for controlling the inverter.

As shown in FIG. 1, a first switch in the form of a P-type MOSFET (hereinafter referred to as PMOS) 101 and a second switch in the form of an N-type MOSFET (hereinafter referred to as NMOS) 102 together establish a first current path through the primary winding 105 of a transformer TR in a first direction. A third switch in the form of a PMOS 103 and a fourth switch in the form of an NMOS 104 together establish a second current path through the primary winding 105 in a second direction. Each of these PMOSs 101 and 103 and NMOSs 102 and 104 has a body diode (or back gate diode). These body diodes allow currents to flow in the directions opposite to the respective normal (intrinsic) directions. Alternatively, separate diodes having a similar function to a body diode can be provided in the switching circuit.

The voltage VCC of a battery BAT serving as a DC power source is supplied to the primary winding 105 of transformer TR via the PMOSs 101 and 103 or NMOSs 102 and 104, to thereby induce across the secondary winding 106 of the transformer TR a high voltage in accord with the winding ratio of the secondary to the primary windings. The induced high voltage is supplied to a cold cathode fluorescent light (CCFL) FL to turn on the fluorescent light FL. The battery can be replaced by a DC power source such as an adapter transforming and rectifying an AC voltage.

The battery BAT may provide the DC supply voltage VCC not only to the inverter of the invention but also to other electric components (or other circuits).

Together with resistors 117 and 118, capacitors 111 and 112 detect the voltage supplied to the cold cathode fluorescent light FL and feed it back to the controller IC 200. Resistors 114 and 115 detect the current that flows through the cold cathode fluorescent light FL and feed it back to the controller IC 200. The capacitor 111 is adapted to give rise resonance with the inductive component of the transformer TR. The parasitic capacitance of the cold cathode fluorescent light FL contributes to the resonance. Elements 113, 116, 119, and 120 are diodes. Capacitors 151 and 152 are provided to stabilize the power supply voltage VCC.

The controller IC 200 has a multiplicity of input/output pins. A first pin 1P is a mode switching terminal for switching the mode of the controller between a PWM mode and an intermittent-operation mode (hereinafter referred to as burst mode). The first pin 1P is externally fed a mode switching signal and a duty signal DUTY for determining the duty ratio of the burst mode. A second pin 2P is a terminal connected to a capacitor 131 for setting up an oscillation frequency of a burst mode oscillator (BOSC). A triangular wave signal for use in the burst mode (burst triangular wave signal BCT) is generated at the second pin 2P.

A third pin 3P is a terminal connected to a capacitor 132 for establishing an oscillation frequency of a PWM mode oscillator (OSC), which generates at the pin 3P a triangular wave signal for performing PWM. A fourth pin 4P is a terminal connected to a resistor 133 for setting the level of charge current to the third pin 3P. Through the fourth pin 4P flows current in accord with the resistance of the resistor 133 and the voltage RT at the pin 4P. A fifth pin 5P is an earth terminal of the controller, having ground potential GND.

A sixth pin 6P is a terminal connected to a resistor 134 for setting the level of charge current to the third pin 3P. The resistor 134 connected to the sixth pin 6P is connected in parallel with a resistor 133, or disconnected therefrom, by an internal circuit of the controller IC 200. The potential SRT of the sixth pin 6P becomes equal to either the ground potential GND or the potential RT of the fourth pin 4P. A seventh pin 7P is a terminal connected to a capacitor 135 for setting a timer latch. The seventh pin 7P is connected to a capacitor 135 for determining the time limit of the internal protection operation. A potential SCP is generated at the terminal in accord with the electric charge in the capacitor 135.

A ninth pin 9P is an input terminal of a first error amplifier. The ninth pin 9P is fed, via a resistor 140, a current detection signal (referred to as detection current) IS associated with the current flowing through the cold cathode fluorescent light FL. The detection current IS is inputted to the first error amplifier. An eighth pin 8P is an output terminal of the first error amplifier. Connected between the eighth pin 8P and the ninth pin 9P is a capacitor 136. The potential of the eighth pin 8P serves as a feedback voltage FB for performing PWM control of the switch circuit. In what follows voltages refers to potentials relative to the ground potential unless otherwise stated.

A tenth pin 10P is an input terminal of a second error amplifier. The tenth pin 10P is fed via a resistor 139 a voltage detection signal (hereinafter referred to as detection voltage) VS in accord with the voltage impressed on the cold cathode fluorescent light FL. The detection voltage VS is inputted to the second error amplifier. A capacitor 137 is connected between the tenth pin 10P and the eighth pin 8P.

An eleventh pin 11P is a terminal for receiving a startup signal and a signal to set up a startup time. The eleventh pin 11P is fed a delayed signal STB that is obtained by delaying a startup signal ST by a resistor 143 and a capacitor 142. A twelfth pin 12P is a terminal connected to a capacitor 141 for setting up a slow startup. The capacitor 141 is connected between the twelfth pin 12P and the ground to generate at the twelfth pin 12P a slow-start voltage SS that grows slowly during a startup.

A thirteenth pin 13P is a synchronization terminal connected to another controller IC to be synchronized with the controller 200. A fourteenth pin 14P is an I/O terminal of an internal clock, which can be connected to another controller IC to cooperate with the controller 200.

A fifteenth pin 15P is an earth terminal for an external FET drive circuit. A sixteenth pin 16P is a terminal for outputting a gate drive signal N1 of the NMOS 102. A seventeenth pin 17P is a terminal for outputting a gate drive signal N2 of the NMOS 104. An eighteenth pin 18P is a terminal for outputting a gate drive signal P2 of the PMOS 103. A nineteenth pin 19P is a terminal for outputting a gate drive signal P1 of the PMOS 101. A twentieth pin 20P is a power supply terminal for receiving the power supply voltage VCC.

As shown in FIG. 2 illustrating the internal structure of the controller IC 200, an oscillation (OSC) block 201 generates a triangular wave signal CT having a period of cycle determined by the capacitor 132 connected to the third pin 3P and the resistors 133-134 connected to the fourth pin 4P, and supplies the triangular wave signal CT to a PWM comparator 214. The OSC block 201 also generates an internal clock synchronized to the triangular wave signal CT and supplies it to a logic block 203.

Together with the capacitor 131 connected to the second pin 2P, a BOSC block 202 forms a circuit for generating a burst triangular signal BCT having a frequency determined by the capacitor 131. The frequency of the burst triangular signal BCT is set much lower than the frequency of the triangular wave signal CT for performing PWM. (That is, BCT frequency<CT frequency.) An analog duty signal DUTY (dc voltage) supplied to the first pin 1P is compared with the burst triangular signal BCT by a comparator 221. The output of the comparator 221 is used to drive an NPN transistor (hereinafter referred to as NPN) 234 via an OR circuit 239. In a case where a digital (PWM) duty signal is supplied to the first pin 1P, a resistor may be connected to the second pin 2P to cause the BOSC block 202 to generate a predetermined burst voltage.

The logic block 203 is supplied with the PWM control signal and the internal clock, for example, to generate switch drive signals in accord with a predetermined logic. An output block 204 generates gate drive signals P1, P2, N1, and N2, in accord with the switch drive signals received from the logic block 203, and supplies them to the respective gates of the PMOSs 101 and 103 and NMOSs 102 and 104.

A slow start block 205 is started up when it is supplied with a startup signal ST and the voltage STB inputted to a comparator 217 (the voltage STB raised slowly by the capacitor 142 and resistor 143) exceeds the reference voltage Vref6 of the comparator 217. The output of the comparator 217 enables the logic block 203. A circuit 249 is an inversion circuit. The output of the comparator 217 resets a flip-flop (FF) circuit 242 via an OR circuit 243. As the start block 205 is started up, the slow-start voltage SS gradually rises. The slow-start voltage SS is inputted to the PWM comparator 214 as a comparison input. Thus, during a startup, PWM is controlled by the slow-start voltage SS.

During a startup, a comparator 216 turns off an NMOS 246 via an OR circuit 247 when the input to the comparator 216 exceeds a reference voltage Vref5. This causes the resistor 134 to be separated from the controller IC 200, which in turn causes the frequency of the triangular wave signal CT for performing PWM to be changed. The OR circuit 247 is also fed the output of a comparator 213.

A first error amplifier 211 compares the detection current IS that is proportional to the current flowing through the cold cathode fluorescent light FL with a reference voltage Vref2 (which is 1.25 V for example), and generates an output in accord with the error between them to control an NPN 235 connected to a constant-current source I1. The collector of the NPN 235 is connected to the eighth pin 8P. The potential of the pin serves as the feedback voltage (also referred to as error signal) FB inputted to the PWM comparator 214 as a comparison input.

The PWM comparator 214 compares the triangular wave signal CT for performing PWM with the lower one of the feedback voltage FB and the slow-start voltage SS to generate a PWM control signal and provides it to the logic block 203 via an AND circuit 248. Under a steady state condition reached after completion of a startup, the triangular wave signal CT is compared with the feedback voltage FB for automated control of the level of current flowing through the cold cathode fluorescent light FL at a preset level.

It is noted that the feedback voltage FB increases and decreases smoothly since the capacitor 136 is connected between the eighth pin 8P and the ninth pin 9P. As a consequence, the PWM control is carried out smoothly, without an abrupt change.

A second error amplifier 212 compares the detection voltage VS that is proportional to the voltage across the cold cathode fluorescent light FL with a reference voltage Vref3 (of 1.25 V for example) to generate an output voltage indicative of the difference between them. This output is used to control a double-collector type NPN 238 having one collector connected to the constant-current source I1. Since the collector of the NPN 238 is also connected to the eighth pin 8P, the feedback voltage FB is also controlled by the detection voltage VS. Thus, the comparator 212 and the NPN 238 together constitute a circuit for controlling the feedback signal FB. Incidentally, if the feedback voltage FB exceeds a reference voltage Vref1 (of 3 V for example), a PNP transistor (hereinafter referred to as PNP) 231 will be turned on to limit excessive rise of the feedback voltage FB.

A comparator 215 compares the voltage generated by dividing the power supply voltage VCC by resistors 240 and 241 with a reference voltage Vref7 (e.g. 2.2 V), and inverts its output to reset the FF circuit 242 via the OR circuit 243 when the power supply voltage VCC reaches a predetermined level.

A comparator 218 compares the slow-start voltage SS with a reference voltage Vref8 (of 2.2 V for example) to turn on the NPN 234 via an AND circuit 244 and an OR circuit 239 when the voltage SS exceeds the reference voltage Vref8. With the NPN 234 turned on, a diode 232 is reversely biased by a current source I2 and as a consequence enables normal operation of the first error amplifier 211.

When the double collector type NPN 238 having the other collector connected to a constant-current source I3 is turned ON by the second error amplifier 212, its collector voltage lowers below a reference voltage Vref9 (of 3 V for example). This causes the output voltage of a comparator 219 to be reversed. A comparator 220 compares the feedback voltage FB with a reference voltage Vref10 (of 3 V for example). Its output voltage is inverted when the feedback voltage FB exceeds the reference voltage Vref10. The outputs of the comparators 219 and 220 are inputted, along with the inverted output of the comparator 218, to a timer block 206 via an OR circuit 245. The timer block causes the inverted signal to be outputted a predetermined time later. The output of the timer block 206 is supplied to the FF 242 to reset it, the Q output of which in turn disables the logic block 203.

Operation of the inverter in accordance with the first embodiment of the invention will now be described with reference to FIGS. 3 and 5 respectively showing the circuit arrangement of the inverter and different stages of the operation, and timing diagrams shown in FIGS. 4, 6, and 7.

Figure 3:
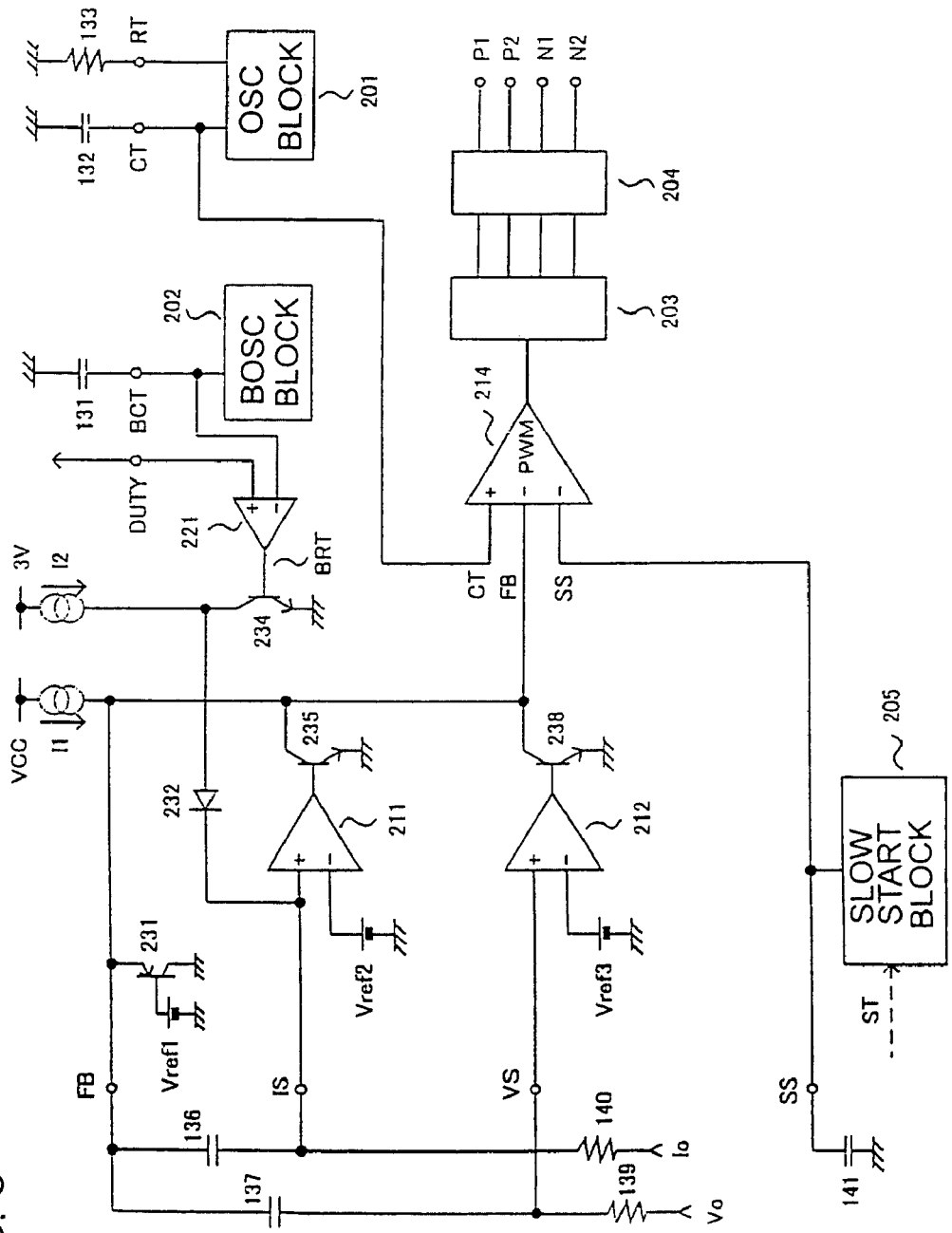
FIG. 3 shows a circuit arrangement illustrating the operation of the inverter in accordance with the first embodiment.

FIG. 3 is a circuit diagram showing components of FIGS. 1 and 2 related to the slow-start mode during a startup and to the burst mode. Thus, reference should be made to FIGS. 1 and 2 in order to understand an overall feature of the operation of the inverter.

As the power supply voltage VCC is supplied to the controller IC 200, the triangular wave signal generation circuit, consisting of the OSC block 201, capacitor 132, and resistor 133, starts generating a triangular wave signal CT having a frequency determined by the capacitance of the capacitor 132 and the resistance of the resistor 133. This triangular wave signal CT is inputted to the (+)-input terminal of the PWM comparator 214. The frequency of the triangular wave signal CT can be set to 120 kHz for example by selecting the capacitance of the capacitor 132 and the resistance of the resistor 133.

The feedback voltage FB is supplied to one of the two (−)-input terminals of the PWM comparator 214 and raised to a high level (upper limit of the feedback voltage) by a common or unification circuit that consists of the constant current source I1 and the NPNs 235 and 238, and is energized by the power supply voltage VCC. The upper limit of the feedback voltage FB is controlled to be at a constant level by the PNP 231 and the reference voltage Vref1.

On the other hand, the slow-start voltage SS inputted to another (−)-input terminal of the PWM comparator 214 remains at zero volt, since it has received no startup signal ST yet. Since the PWM comparator 214 prioritizes the input signal, which is lower one of the feedback voltage FB and the slow-start voltage SS, the comparator 214 outputs no PWM control signal then.

When a startup signal ST is externally supplied to the start block 205 serving as a slow-start circuit, the constant-current source in the start block 205 is enabled to flow a constant current through the capacitor 141. The capacitor 141 is charged by the constant current, causing the slow-start voltage SS to increase linearly with a predetermined time constant. That is, a slow-start is started for the startup.

The slowly rising slow-start voltage SS is compared with the triangular wave signal CT in the PWM comparator 214, whereby a PWM control signal is outputted therefrom in accord with the magnitude of the slow-start voltage SS. This PWM control signal is supplied to the MOSFETs 101-104 via the logic block 203 and the output block 204, thereby enabling the inverter to perform its operation.

Since the cold cathode fluorescent light FL connected to the inverter as a load will not be turned on until the voltage applied thereto reaches a predetermined level, the output voltage Vo of the inverter rises with the slow-start voltage SS in an initial stage of the slow startup. Thus, unlike conventional inverters, the inverter of the invention will not initially impress on the cold cathode fluorescent light FL an excessively high output voltage Vo (as high as 2000-2500 V for example) due to the initial feedback voltage FB being at its upper limit level. Moreover, since there can be no inrush current accompanying an excessive output voltage Vo, the cold cathode fluorescent light FL and the major circuit components (e.g. MOSFETs 101-104, transformer TR, battery BAT) of the inverter will be greatly relieved of damage and stress that will otherwise arise from an excessive voltage.

The output voltage Vo and output current Io are measured, and the resultant detection voltage VS and detection current IS are compared with respective reference voltages Vref2 and Vref3 by the respective first error amplifier 211 and the second error amplifier 212. The outputs of these comparators respectively control the NPN 235 and NPN 238. As the NPN 235 and NPN 238 are controlled by the detection voltage and detection current, the feedback voltage FB begins to fall from the upper limit level.

When the output voltage Vo reaches a predetermined startup voltage (about 1000 V), the output current Io begins to flow and turns on the cold cathode fluorescent light FL, while the output voltage Vo falls to an operating voltage (about 600 V). Even then no excessive inrushing current will flow into the cold cathode fluorescent light FL. The output current Io still grows larger gradually, while the output voltage Vo remains at substantially a constant operating voltage. As the output voltage Vo (or the output current Io) grows larger so that the NPN 235 (or NPN 238) is controlled by the detection voltage (or detection current), the feedback voltage FB gradually lowers from its upper limit level owing to the feedback action of the capacitor 136 or capacitor 137.

The output current Io increases with the slow-start voltage SS, while the feedback voltage FB decreases. At the point of time when the feedback voltage FB becomes equal to the slow start-voltage SS, comparison of the triangular wave signal CT with the slow start-voltage SS in the PWM comparator 214 is switched to the comparison with the feedback voltage FB. This completes the slow start. This slow start takes a comparatively long time, since it takes time to enable the disabled cold cathode fluorescent light FL. The time required for the slow start can be set to an arbitrary length as needed by adjusting the capacitance of the capacitor 141 externally connected to the IC 200.

The output current Io is controlled to be at a predetermined constant level determined by the reference voltage Vref2. The luminance of the cold cathode fluorescent light FL is determined by the magnitude of the current flowing through it. Hence, in order to maintain this current, a substantially constant operating voltage must be applied to it. Therefore, in order to turn on the cold cathode fluorescent light FL, the output voltage Vo is brought to a high level during a startup, but it can be lowered to a low operating voltage once the fluorescent light FL is turned on. Hence, in a steady state operation, the level of the feedback voltage FB is determined based on the magnitude of the output current Io.

In preparation for a re-startup of the inverter following a shutdown, the start block 205 may be provided therein with a discharge circuit for discharging the charge stored in the capacitor 141. The discharge of the capacitor 141 may be executed by a startup signal ST.

Next, referring to FIGS. 4 and 5, a logic for forming the gate drive signals P1-N2 for performing the PWM control in the logic block 203 and the output block 204 will now be described in detail.

Based on a triangular wave signal CT for performing PWM and the feedback voltage FB, a first gate drive signal P1 for driving the first semiconductor switch (PMOS 101), a second gate drive signal N1 for driving the second semiconductor switch (NMOS 102), a third gate drive signal P2 for driving the third semiconductor switch (PMOS 103); and a fourth gate drive signal N2 for driving the fourth semiconductor switch (NMOS 104) are generated in such a way that a first simultaneous OFF period Toff (of 300 nsec for example) is established in which both the PMOSs 101 and 104 are turned off, and a second simultaneous OFF period Toff (of 300 nsec for example) is established in which both the PMOSs 103 and 102 are turned off. Furthermore, each of the gate drive signals P1-N2 is generated in such a way that the direction of the current that flows through the primary winding 105 of the transformer TR is switched from a first direction to the second, or vise versa, at the moment when the current is nullified.

Figure 4:
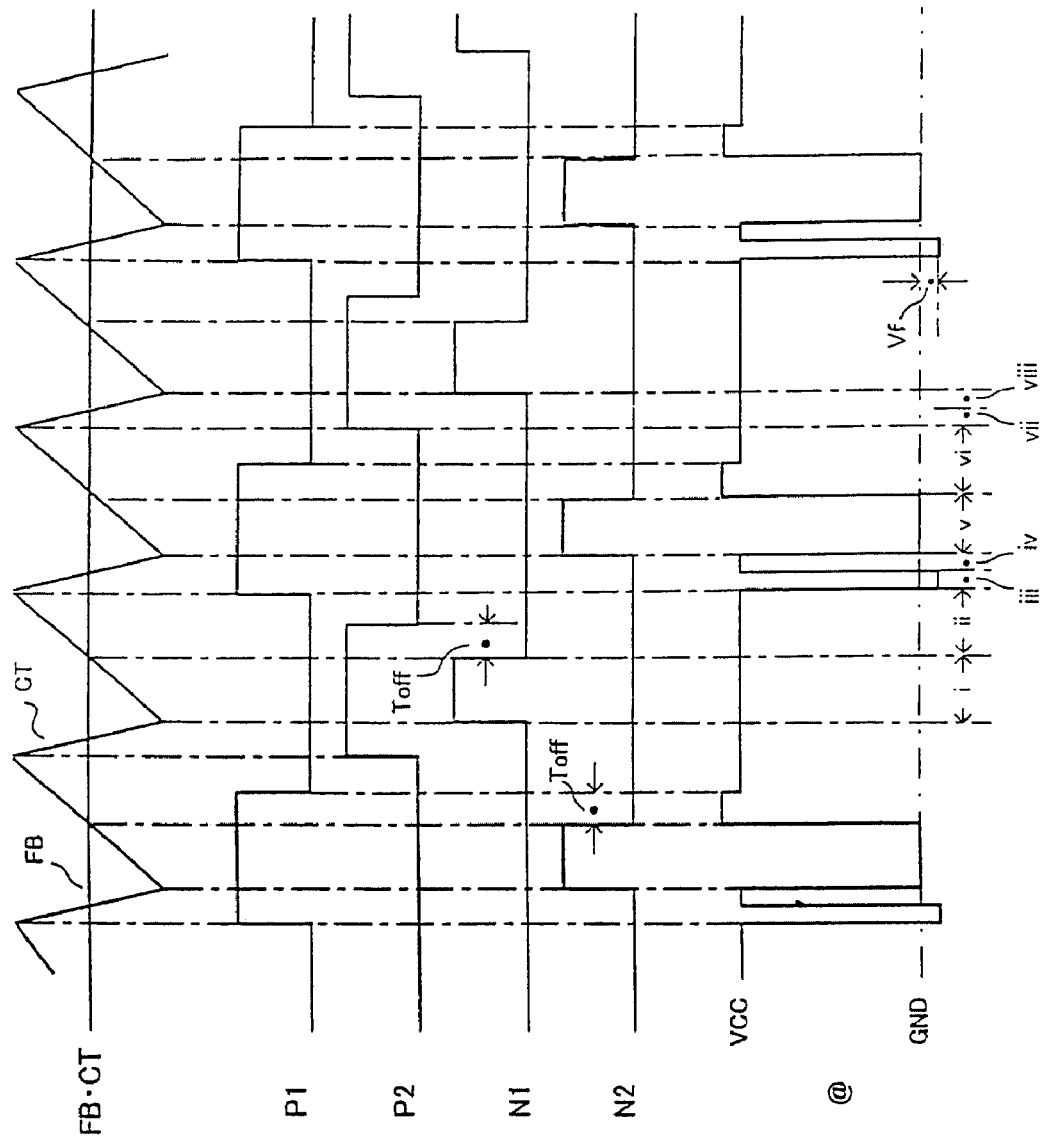
FIG. 4 is a timing diagram illustrating the operation of the inverter in accordance with the first embodiment.
Figure 5:
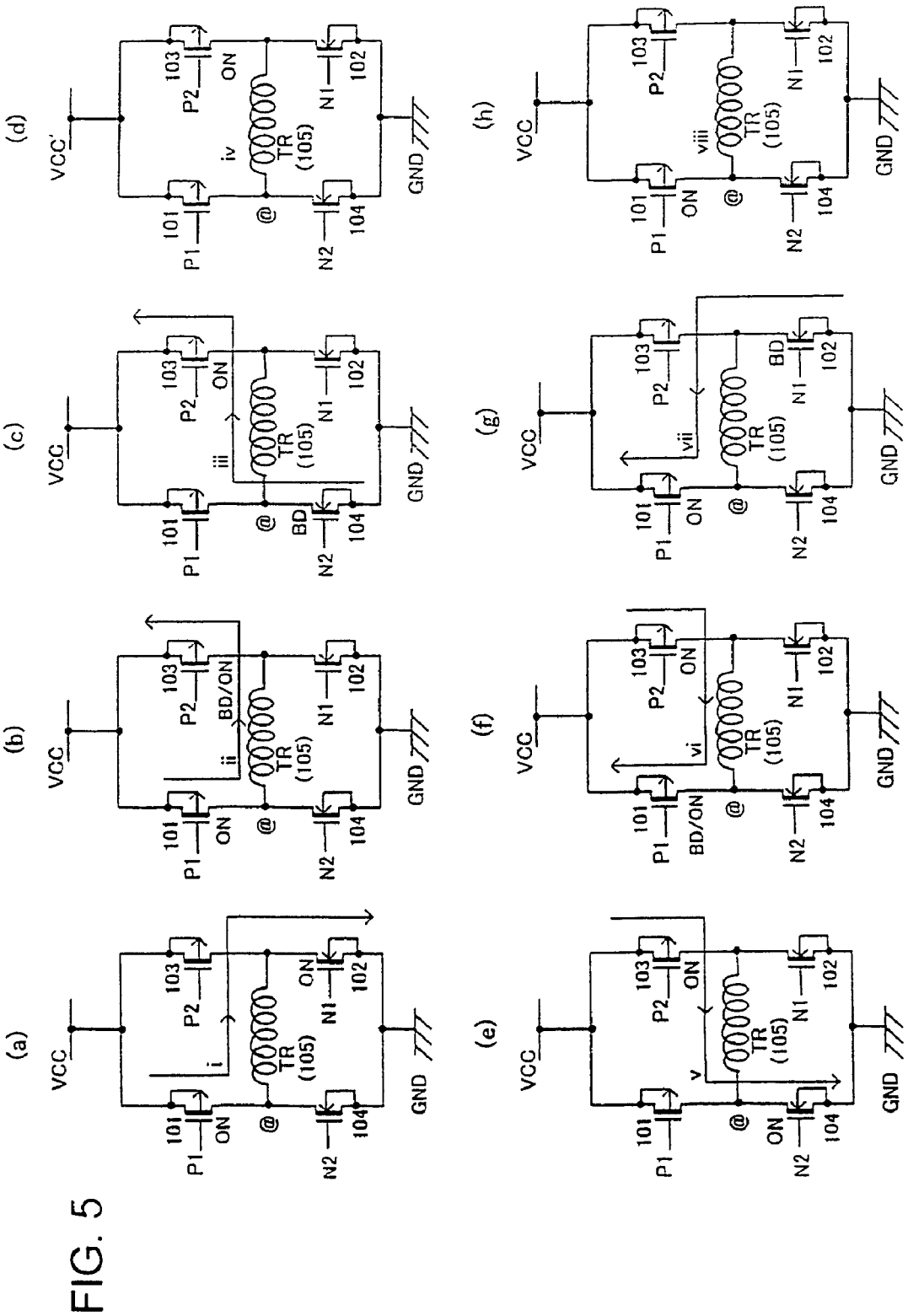
FIG. 5 shows operational states of the first embodiment of the invention.

As shown in FIG. 4, during period i, the gate drive signal N1 has a high (H) level; the gate drive signal N2 has a low (L) level; the gate drive signal P1 the L level; and the gate drive signal P2 the H level; the PMOS 101 and NMOS 102 are turned on, allowing current to flow from the power supply BAT through the primary winding 105 in the first direction. This condition is shown in FIG. 5(a).

In period ii, the gate drive signal N1 is pulled down. A first simultaneous OFF period Toff is established until the gate drive signal P2 is pulled down to L level, in which the PMOS 103 and NMOS 102 are turned OFF, thereby preventing penetration current from flowing through the inverter. During this period, although only the PMOS 101 is turned on, current due to the energy stored in the transformer TR continues to flow in the first direction through the body diode of the PMOS 103 and the PMOS 101.

In the later half of period ii, the gate drive signal P2 goes low (L), causing the PMOS 103 to be turned on and the current path to be shifted from the body diode to the channel of the PMOS 103. This condition is shown in FIG. 5(*b*).

In period iii, the gate drive signal P1 goes high (H), thereby turning off the PMOS 101. Yet, the current flowing in the first direction, if any, continues to flow in the same direction through the body diode of the NMOS 104, which is turned off. Under this condition, the potential at the point marked @ is lower than VCC for periods i and ii by a voltage drop Vf across the body diode. The condition in period iii is shown in FIG. 5(*c*).

Period iv begins when the current flowing in the first direction due to the energy stored in the transformer TR becomes zero. In this period iv, only the PMOS 103 is turned on but no current flows through the bridge as shown in FIG. 5(*d*). Thus, according to the invention, prior to changing the direction of the current through the primary winding 105, a condition is established in which no current flows through it.

This zero-current condition prior to switching the direction of the current can be attained by setting appropriate pulse widths in the PWM control in accord with the electric requirements of components including the transformer TR, resonance capacitors 111 and 112, and cold cathode fluorescent light FL.

In period v, the gate drive signal P2 is low (L) and the gate drive signal P1 is high (H), so that the PMOS 103 is turned on. Under this condition, the NMOS 104 will be turned ON, resulting in zero-current switching, when the gate drive signal N2 goes (H). With the PMOS 103 and NMOS 104 turned ON, current flows from the power supply BAT through the primary winding 105 in the second direction. This condition is shown in FIG. 5(*e*).

In period vi, the gate drive signal N2 goes low (L), which results in a second simultaneous OFF period Toff in which both the PMOS 101 and NMOS 104 are turned off until the gate drive signal P1 goes low (L), thereby preventing a penetration current from flowing through the inverter. During this period, although only the PMOS 103 is turned on, current due to the energy stored in the transformer TR continues to flow through the body diode of the PMOS 101 and through the PMOS 103 in the second direction. In the later half of period vi, the gate drive signal P1 goes low (L), causing the PMOS 101 to be turned ON and the current path to be shifted from the body diode to the channel of the PMOS 101. The condition of period vi is shown in FIG. 5(*f*).

In period vii, the inverter undergoes a similar operation to that in period iii, except that the direction of the current is reversed. This condition is shown in FIG. 5(*g*). In period viii, current flowing in the second direction becomes zero, leaving only the PMOS 101 turned on, as shown in FIG. 5(*h*). The potential at the point marked @ changes as shown in FIG. 4.

Zero-current switching is also executed when the current direction is reversed from the second to the first.

In this way, the second switch 102 is turned on at every other apex of the triangular wave signal CT on one side thereof and remains turned on until a triangular signal immediately after the turning on of the triangular PWM signal becomes equal in magnitude to the feedback signal FB. The first switch 101 is turned on a predetermined time before the second switch 102 is turned on, and remains so until a triangular signal immediately after the second switch 102 is turned off reaches its apex on the other side of the triangular wave signal CT. The fourth switch 104 is turned on at the point of time matched with every other apex that is on the same one side of the triangular wave signal CT associated with the turning on of the second switch 102 but is different from the apices associated with the second switch 102. The fourth switch 104 remains turned ON until a triangular signal that follows immediately after the turning on of the fourth switch 104 becomes equal in magnitude to the feedback signal FB. The PMOS 103 is turned on a predetermined time before the NMOS 104 is turned on while the second switch 102 is turned off and the first switch 101 is turned on, and remains turned on until a triangular signal immediately after the turning off of the fourth switch 104 reaches its peak on the other side.

Alternatively, NMOSs switches may be used in place of the PMOS 101 and PMOS 103 of FIG. 1 respectively serving as the first and the third switches. In this case, the gate drive signals must also be changed accordingly.

Next, the burst mode will be described. Under the condition where the controller IC 200 is supplied with the power supply voltage VCC, the burst triangular wave signal BCT is generated by the burst triangular wave signal generating circuit that consists of the BOSC block 202 and the capacitor 131. The frequency of the burst triangular wave signal BCT is determined by the capacitance of the capacitor 131 and the internal resistance of the circuit. The burst mode is controlled by changing the level of the duty signal DUTY so as to cause, or not to cause, the duty signal DUTY to cross the burst triangular wave signal BCT, and by adjusting the time of crossing if it crosses the burst triangular wave signal.

Figure 6:
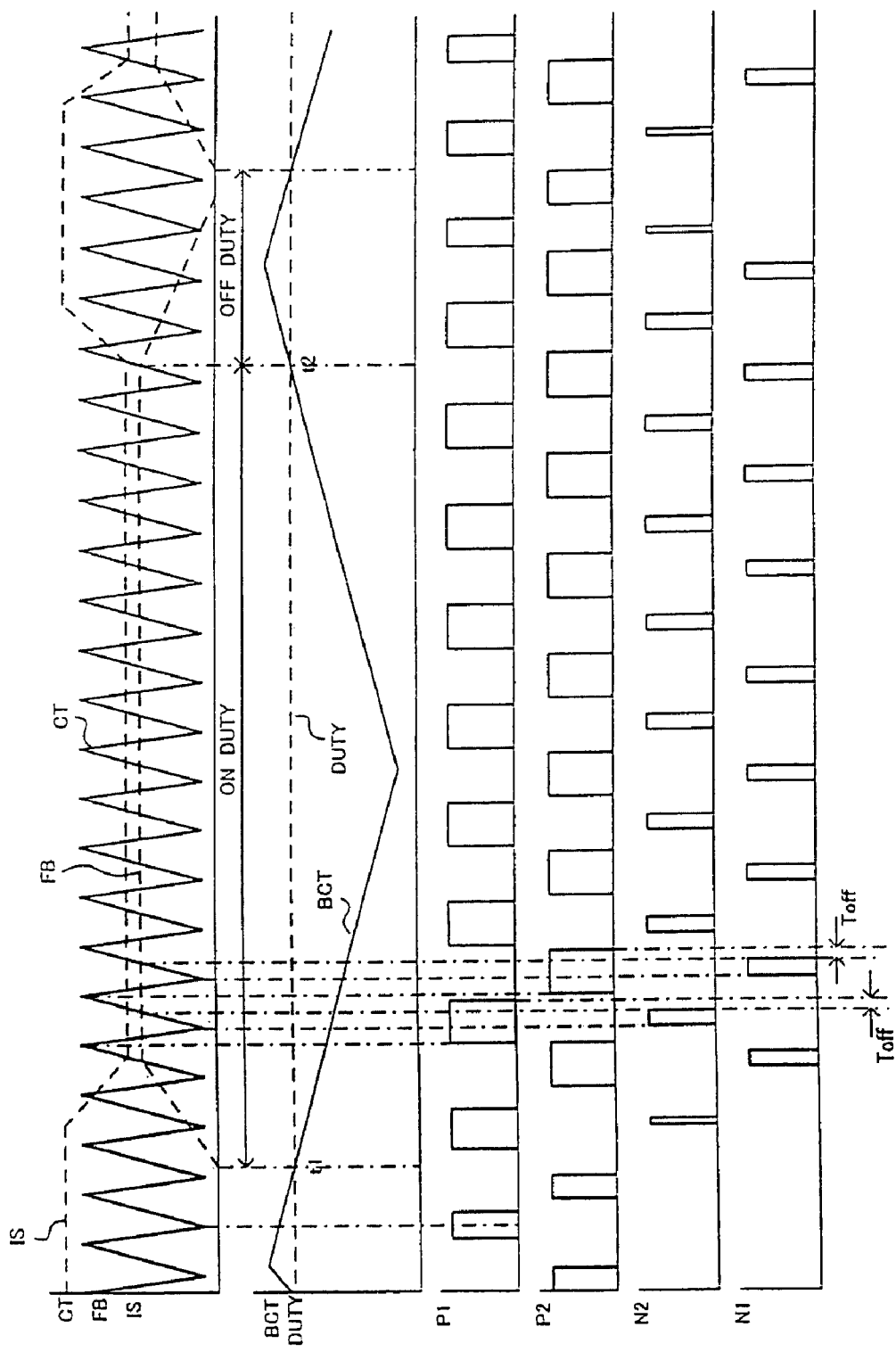
FIG. 6 is another timing diagram illustrating the operation of the first embodiment of the invention.

The PWM control is performed during ON DUTY periods in which the duty signal DUTY exceeds the burst triangular wave signal BCT, as shown in FIG. 6. On the other hand, during OFF DUTY periods in which the duty signal DUTY is lower than the burst triangular wave signal BCT, the PWM control is stopped, thereby stopping power to the cold cathode fluorescent light FL.

The frequency of the triangular wave signal CT for performing PWM is 120 kHz for example. Since the triangular wave signal CT is controlled by the burst triangular wave signal BCT having a frequency of 150 Hz for example, no visual problem will arise. By controlling the magnitude of the duty signal DUTY, it is possible to control the amount of power supplied to (or the amount of light emitted by) the cold cathode fluorescent light FL beyond the range of control that can be attained solely by the PWM. The frequency of the burst triangular signal BCT (burst frequency) is set to a predetermined frequency (100-500 Hz for example) by selecting an appropriate capacitor having a proper capacitance for the capacitor 131.

Thus, the burst frequency is adjusted to be within a predetermined audible frequency range. The iron core and the windings of the transformer TR can be deformed and/or displaced by the alternating changes of magnetic flux through them.

Since the burst frequency is in an audible frequency range, sounds generated by the core and the windings can be heard as hamming of the transformer. Hamming of the transformer presents a problem especially when an inverter is used as a backlight source of a liquid crystal display of a sound generating electronic apparatus such as a liquid crystal TV set and a notebook PC.

In the invention, the error signal FB is set to a substantially zero level by an intermittent-operation control circuit during OFF DUTY periods of the intermittent operation of the inverter based on an intermittent-operation signal (burst signal) BRT. In addition, the error signal FB is gradually increased when the intermittent-operation control circuit makes a transition from an OFF state (OFF DUTY state) to an ON state (ON DUTY state), and gradually decreased when the circuit makes a transition from an ON state to an OFF state. This suppresses hamming of the transformer accompanying the burst control to a significantly low level.

It is noted that even when the current level of the CCFL is low, the positive-negative symmetry of the current can be retained by performing the inventive PWM in all phases of the intermittent operation including the rises and falls of the intermittent operation. The retention of the positive-negative current symmetry of CCFL current and the over-current prevention scheme suppresses reduction of CCFL life.

It should be appreciated that during OFF DUTY periods the error signal FB is reduced to a substantially zero volt to completely nullify the output current Io. If, however, the pulse width of the triangular wave signal is decreased to realize OFF states, a "single-side lighting" of lamp (peak discharge phenomenon) can occur in which the CCFL is turned on only by the current of one polarity. If such single-side lighting phenomenon takes place, mercury will build up in the neighborhood of the electrode of one polarity, which will significantly shorten the lamp life. In the invention, no single-side lamp lighting phenomenon will never take place, since the output current Io and output voltage Vo are completely nullified during OFF periods of the intermittent operation, thereby suppressing reduction of the CCFL life.

Figure 7:
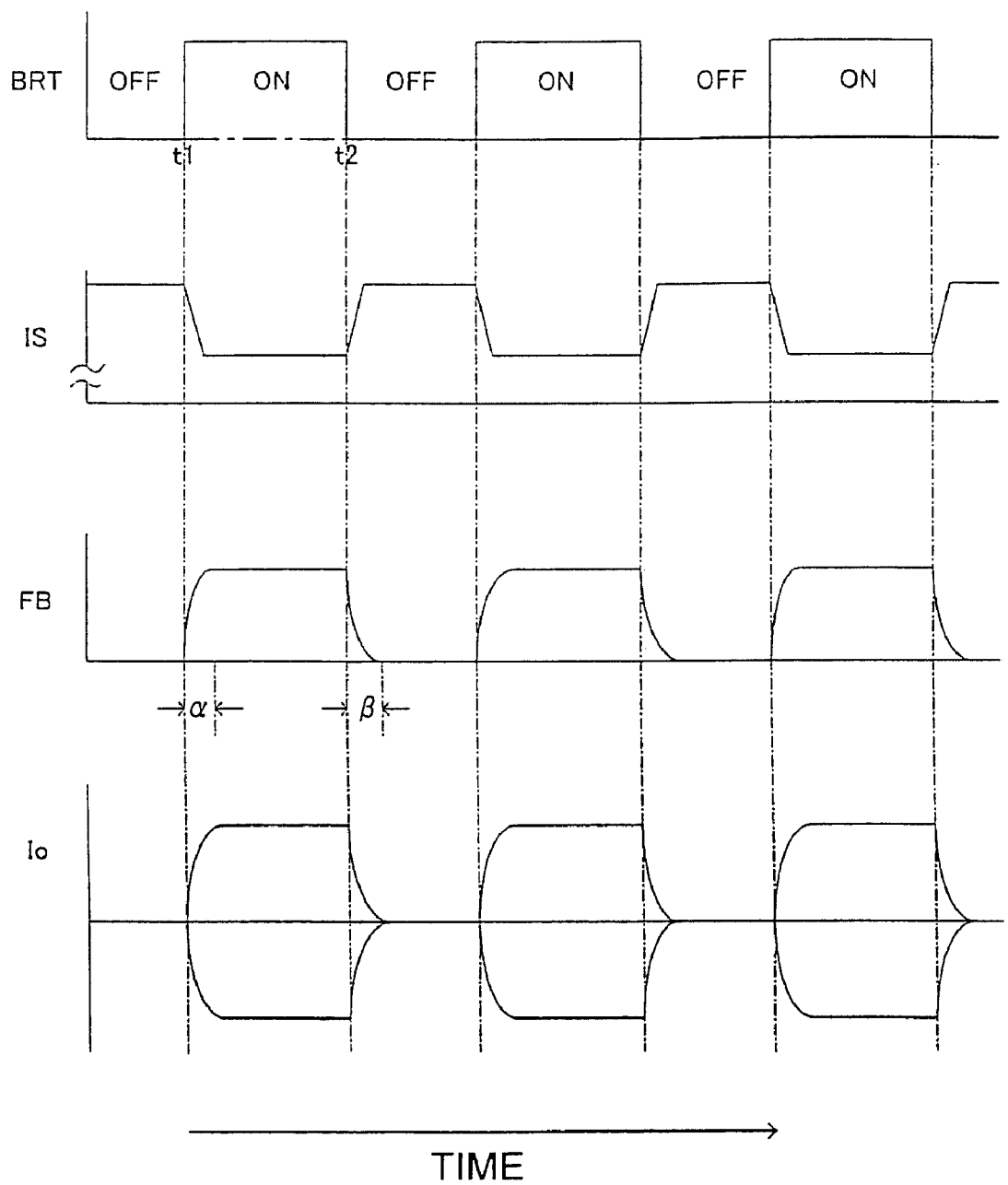
FIG. 7 is still another timing diagram illustrating the operation of the first embodiment of the invention.

Looking closely at the circuit in operation, and referring to FIGS. 6 and 7, it can be seen that during an OFF DUTY period the intermittent-operational signal (burst signal) BRT outputted from the comparator 234 has a low (L) level so that the NPN 234 is turned off.

Under this condition, the diode 232 is biased in the forward direction by the constant current source I2 and the capacitor 136 of the feedback circuit is charged by the constant current source I2 via the diode 232. As a result, the detection current IS is large; the error output of the first error amplifier 211 has a high level; and the NPN 235 is turned on, so that the feedback voltage FB is substantially zero volt.

Since the PWM comparator 214 compares the positive (+) triangular wave signal CT with one of the two negative (−) inputs that has a lower voltage than the other, the comparator will output no PWM control signal during an OFF DUTY period, as shown in the left end of FIG. 6.

At time t1 when the burst mode shifts from an OFF DUTY period to an ON DUTY period, the burst signal BRT goes high (H) from L level, thereby turning on the NPN 234. Thus, the diode 232 is relieved from the forward bias imposed by the constant current source I2.

The electric charge stored in the capacitor 136 is discharged therefrom through the constant current source I1, capacitor 136, resistor 140, and resistor 115. As the capacitor 136 is discharged, the detection current IS slowly decreases, while the feedback voltage FB slowly rises. The detection current IS eventually lowers to a predetermined level, at which a normal PWM control is performed.

In this way, in a shift from an OFF DUTY period to an ON DUTY period, the feedback voltage FB gradually rises from substantial 0 volt, over a period (indicated as "α" in FIG. 7) determined by the discharge of the capacitor 136. Accordingly, the pulse of the PWM control signal gradually increases its width. As a result, the output current Io undergoes a slow start, i.e. increases gradually. Therefore, no overshoot of the output current Io occurs in a shift to an ON DUTY period.

During ON DUTY periods, the burst signal BRT has a high (H) level to turn on the NPN 234, which biases the diode 232 in the reverse direction, and turns it off. Under this condition, the first error amplifier 211 generates an output voltage in accord with the magnitude of the detection current IS inputted thereto, which controls the conductivity of the NPN 235. As a result, the PWM control signal is supplied from the PWM comparator 214 to the logic block 203, which causes the output block 203 to output the gate drive signals P1-N2 for executing PWM control of the PMOSs 101 and 103 and NMOSs 102 and 104. It is noted that period Toff shown in FIG. 6 is provided to establish a simultaneous OFF period to prevent penetration current from occurring.

When the PWM control proceeds from an ON DUTY operation to an OFF DUTY operation at time t2, the burst signal BRT goes down from H to L level, thereby turning off the NPN 234, which in turn causes the diode 232 to be biased in the forward direction by the constant current source I2.

Then the capacitor 136 is charged by the current that flows from the constant current source I2 to the capacitor 136 via the NPN 235. The charging of the capacitor 136 causes the detection current IS to slowly increase and the feedback voltage FB to slowly decrease (as represented by a curve "β" in FIG. 7). The detection current IS will reach its upper limit (which equals the power supply voltage of 3 Volts of the constant current source I2), while the feedback voltage FB will decreases to substantially 0 volt. Then the PWM control is stopped.

In this way, when the burst mode shifts from an ON DUTY period to an OFF DUTY period, the feedback voltage FB slowly decreases from the level maintained under the PWM control to zero volt over the charging time of the capacitor 136. That is, the bust modes undergoes a slow end. As a consequence, the pulse width of the PWM control signal gradually decreases from its ordinary pulse width. Hence, the output current Io subsequent to a shift to an OFF DUTY period gradually decreases.

In the burst mode, unlike in a startup operation, the cold cathode fluorescent light FL is already turned on, so that the periods of slow start and slow end are made shorter than the period of the slow start in a startup.

If the circuit for securing soft start in the startup were also used in the slow start and slow end in the burst mode, rising time and falling time β of the burst mode would be too long, which would make it difficult to precisely control the load current. Conversely, if the circuits for securing slow start and slow end in the bust mode were used for the soft start of the startup, then inrush current during the startup could not be effectively suppressed.

In the invention, the lengths of the slow start and slow end of the burst mode are controlled by the capacitor 136 provided in the feedback circuit. This implies that the slow start and slow end can be appropriately implemented using an existing circuit element for executing the PWM control, without resorting to any other special circuit means.

Since the slow start and slow end of the intermittent operation are carried out by charging and discharging of the capacitor of the feedback circuit, the lengths of the slow start and slow end can be set to arbitrarily short periods, independently of the length of the slow start of the startup of the inverter. Thus, the lengths can be adjusted to suit for the transformer used by selecting the capacity of the feedback capacitor, so that it is easy to reduce the hamming of the transformer to a level permissible for the electronic apparatus utilizing the inverter.

It should be appreciated that, owing to the inventive PWM scheme of the inverter that can be employed in all phases of intermittent operation including rises and falls thereof, the positive-negative symmetry of the CCFL current is well maintained even when the current is small, thereby preventing over-current from flowing through the CCFL and extending CCFL life.

Figure 8:
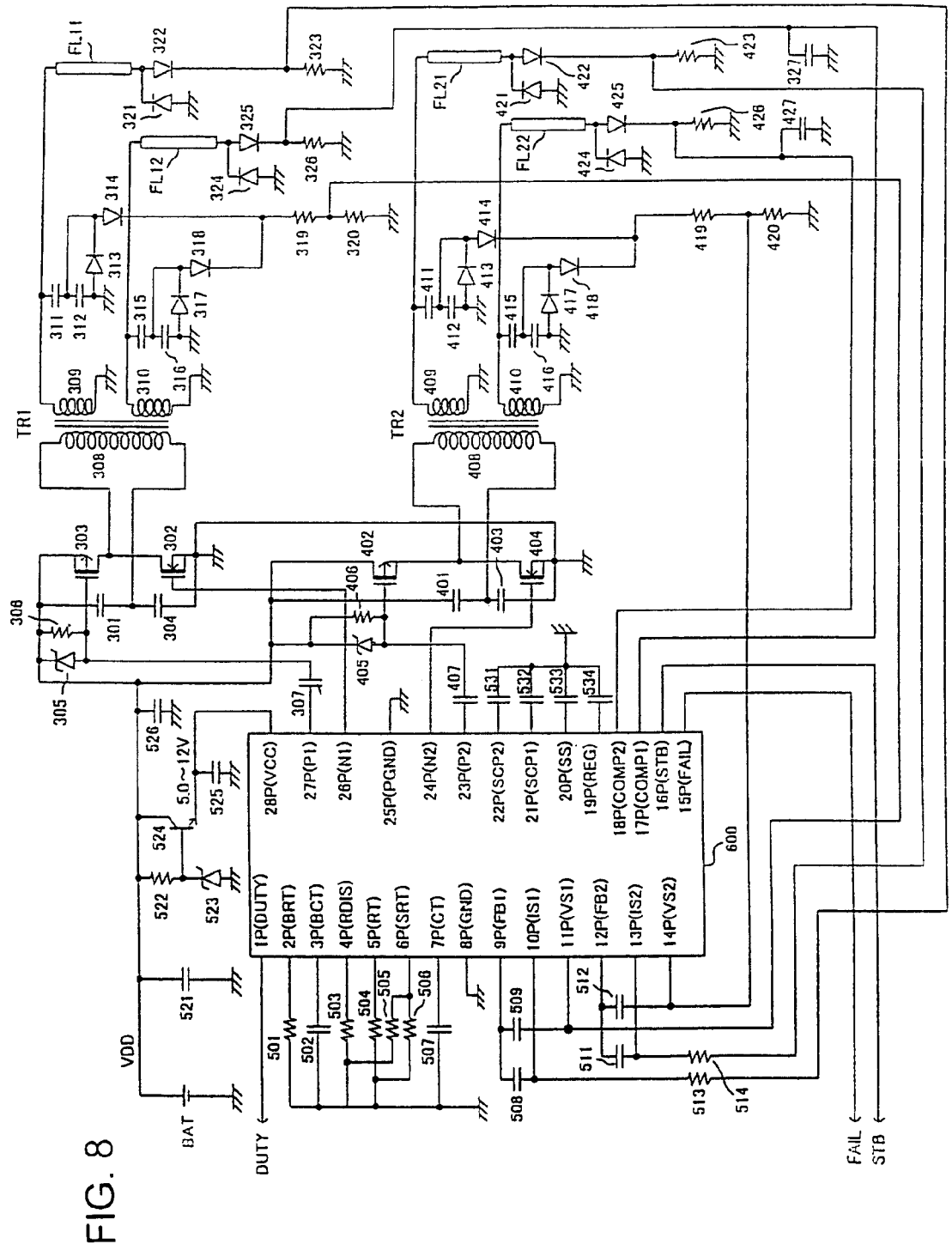
FIG. 8 shows an overall arrangement of an inverter in accordance with a second embodiment of the invention.

Referring to FIG. 8, there is shown an overall arrangement of an inverter in accordance with a second embodiment of the invention. As shown in FIG. 8, the inverter is provided with two transformers TR1 and TR2 and a half-bridge type switching circuit for performing PWM control. Each of the transformers TR1 and TR2 has two secondary windings 309-310 and 409-410. In the example shown herein, four cold cathode fluorescent lights FL11, FL12, FL21, and FL22 are connected to the second windings 309-310 and 409-410.

A first transformer system associated with the transformer TR1 of FIG. 8 will be described. This half-bridge type switch circuit has a first capacitor 301 and a first switch in the form of an NMOS 302 that establishes a current path through the primary winding 308 of the transformer TR1 in the first direction (referred to as first path). The switch circuit also has a PMOS 303 serving as a second switch and a second capacitor 304 for establishing a second current path through the primary winding 308 in a second direction (referred to as second path). Each of the PMOS 303 and NMOS 302 has a body diode (or back gate diode). These body diodes allow currents to flow in the directions opposite to the respective normal (intrinsic) directions. Alternatively, separate diodes having a similar function to a body diode can be provided in the switching circuit.

A power supply voltage VDD is supplied from a DC power source BAT to the primary winding 308 of a transformer TR1 via a PMOS 303, an NMOS 302, and capacitors 301 and 304 to induce high voltages in the secondary windings 309-310 in accord with the respective winding ratios of the secondary to the primary windings. The induced high voltages are supplied to the cold cathode fluorescent lights FL11 and FL12 to turn on these fluorescent lights. Because the power supply voltage VDD of the DC power source BAT differs from the power supply voltage VCC of a controller IC 600 for controlling the inverter, there are provided a Zener diode 305, a resistor 306, and a capacitor 307 to raise the level of the gate voltage of the PMOS 303.

Capacitors 311-312 and 315-316, together with resistors 319-320, detect the voltages impressed on the respective cold cathode fluorescent lights FL11 and FL12, and feed the detected voltages back to the controller IC 600. Resistors 323 and 326 detect the currents flowing through the cold cathode fluorescent lights FL11 and FL12, and feed them back to the controller IC 600. Capacitors 311 and 315 are adapted to give rise resonances with the inductive component of the transformer TR1. Parasitic capacitances of the cold cathode fluorescent lights FL11 and FL12 also contribute to the resonances. Elements 313-314, 317-318, 321-322, and 324-325 are diodes. A capacitor 327 is provided to stabilize the power supply voltage.

A second transformer system associated with the second transformer TR2 has like elements to those of the first inverter system, which are denoted by like reference numerals in the 400s. For example, the primary winding of the second transformer system is numbered 408 in correspondence with the primary winding 308 of the first transformer system. The same numbering system applies to other elements. Since the first transformer system and the second transformer system are essentially the same in structure, the description of the latter system will be omitted.

The invert-controlling IC 600 has a multiplicity of input/output (I/O) pins. The controller IC 600 has substantially the same pin arrangement and internal structure as the controller IC 200 of the first embodiment. However, this inverter is structurally different in part in the feedback system from the first embodiment in that this inverter has two transformer systems associated with the first and the second transformers TR1 and TR2, respectively, each transformer having two secondary windings each connected to one of four cold cathode fluorescent lights FL11-FL22.

In what follows, additional description will be given regarding the different features of the controller IC 600 than those of the controller IC 200. A second pin 2P is a terminal connected to a resistor 501 for setting up a charge-discharge current for generating a burst triangular signal BCT. A fourth pin 4P is a terminal connected to a resistor 503 for setting up a discharge current for generating a triangular wave signal CT for performing PWM. These terminals can be also provided in the controller IC 200 as needed.

A fifteenth pin 15P is a terminal for outputting an error detection signal indicative of abnormality (which is equivalent to the output of FF 242 of FIG. 2) to an external device. A seventeenth pin 17P and an eighteenth pin 18P are provided for receiving detection signals to protect from surge currents the second cold cathode fluorescent light FL12 belonging to the first transformer system associated with the first transformer TR1 and fluorescent light FL22 belonging to the second transformer system associated with the second transformer TR2. The voltages of the detection signals are compared with respective reference voltages of the internal comparators of the respective systems. A nineteenth pin 19P is a terminal for outputting the output voltage of an internal regulator to an external device.

Each of the pins 1P-28P of the IC 600 corresponds to the respective pin of the inverter-controlling IC 200 having the same pin number and the same signal codes in parentheses. (For example, "DUTY" of IC 600 corresponds to "DUTY" of IC 200; "FB1" and "FB2" of IC 600 correspond to "FB" of IC 200).

In the IC 600, a resistor 501 is connected between the second pin 2P and the ground; a capacitor 502 between the third pin 3P and the ground; the resistor 503 between the fourth pin 4P and the ground; a resistor 504 between the fifth pin 5P and the ground; resistors 505 and 506 between the sixth pin 6P and the ground; and a capacitor 507 between the seventh pin 7P and the ground, as shown.

A capacitor 508 is connected between the ninth pin 9P and the tenth pin 10P. A detection current IS1 is fed to the tenth pin 10P via a resistor 513. A capacitor 509 is connected between the ninth pin 9P and the eleventh pin 11P. The pin 11P is fed a detection voltage VS1.

A capacitor 511 is connected between the twelfth pin 12P and the thirteenth pin 13P. The pin 13P is fed a detection current IS2 via a resistor 514. A capacitor 512 is connected between the twelfth pin 12P and the fourteenth pin 14P. The pin 14P is fed a detection voltage VS2. Elements 531-534 are capacitors.

The voltage VDD of the DC power source BAT is regulated by a series regulator that comprises a resistor 522, a Zener diode 523, and an NPN 524 before it is provided as the predetermined power supply voltage VCC (in the range 5-12 V for example) for the IC 600. Capacitors 521 and 526 are stabilizer capacitors for stabilizing the power supply voltage VDD. Similar capacitors may be provided at other points of the circuit as needed.

Figure 10:
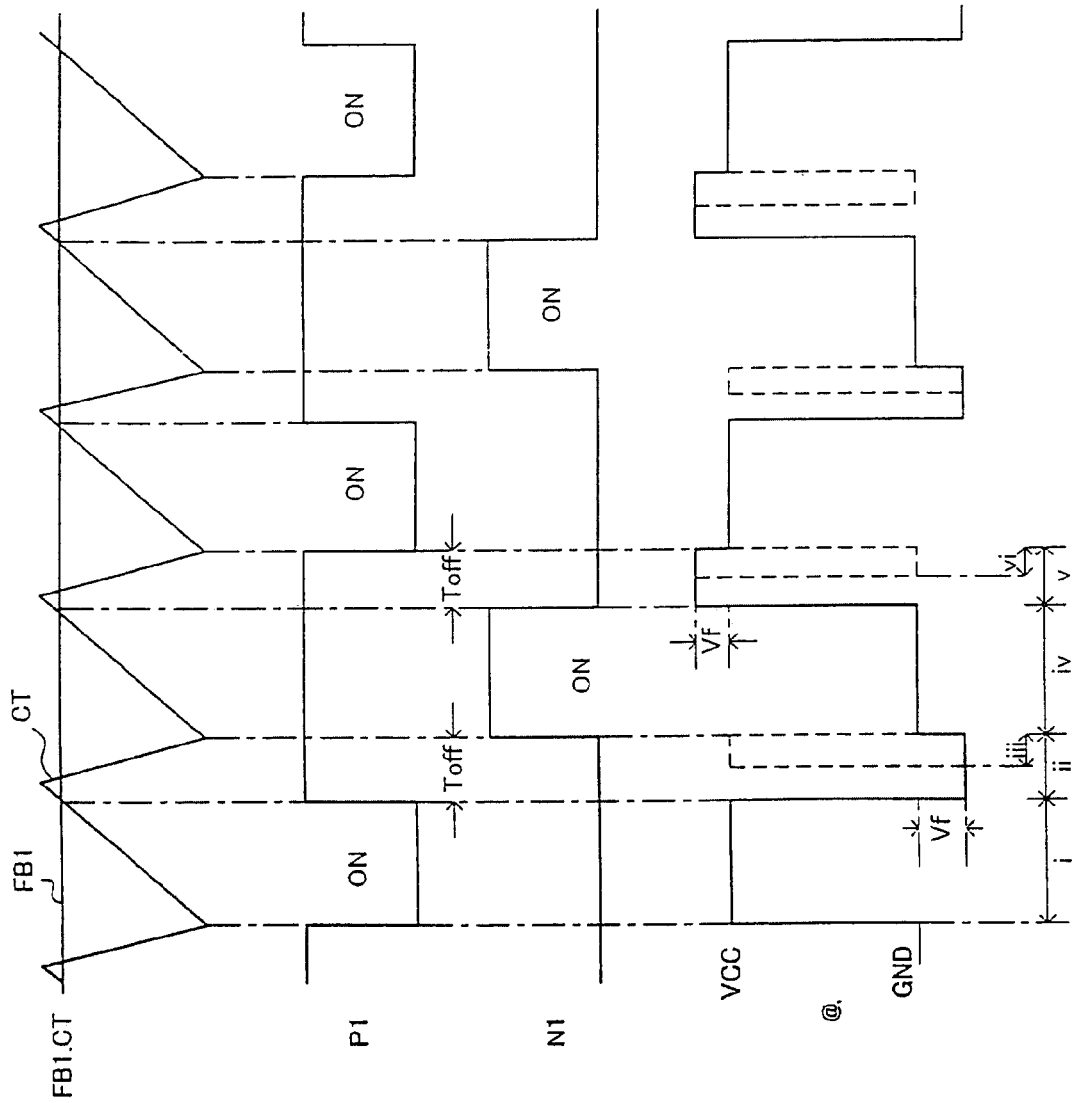
FIG. 10 is still another timing diagram illustrating the operation of the second embodiment of the invention.
Figure 11:
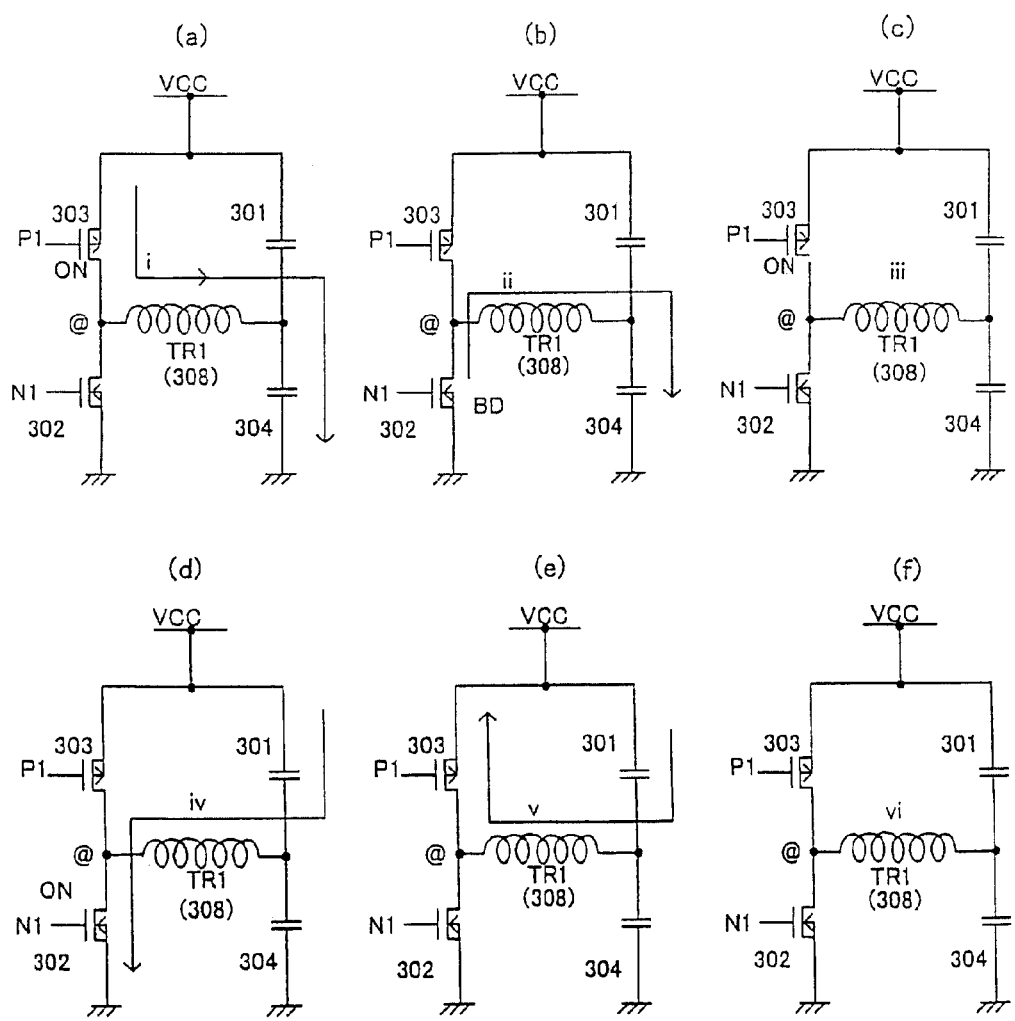
FIG. 11 shows operating states of the second embodiment of the invention.

Next, referring to the timing diagram shown in FIGS. 9 and 10, along with FIG. 11 illustrating different stages of inverter operation, operation of the inverter according to the second embodiment of the invention will now be described.

Figure 9:
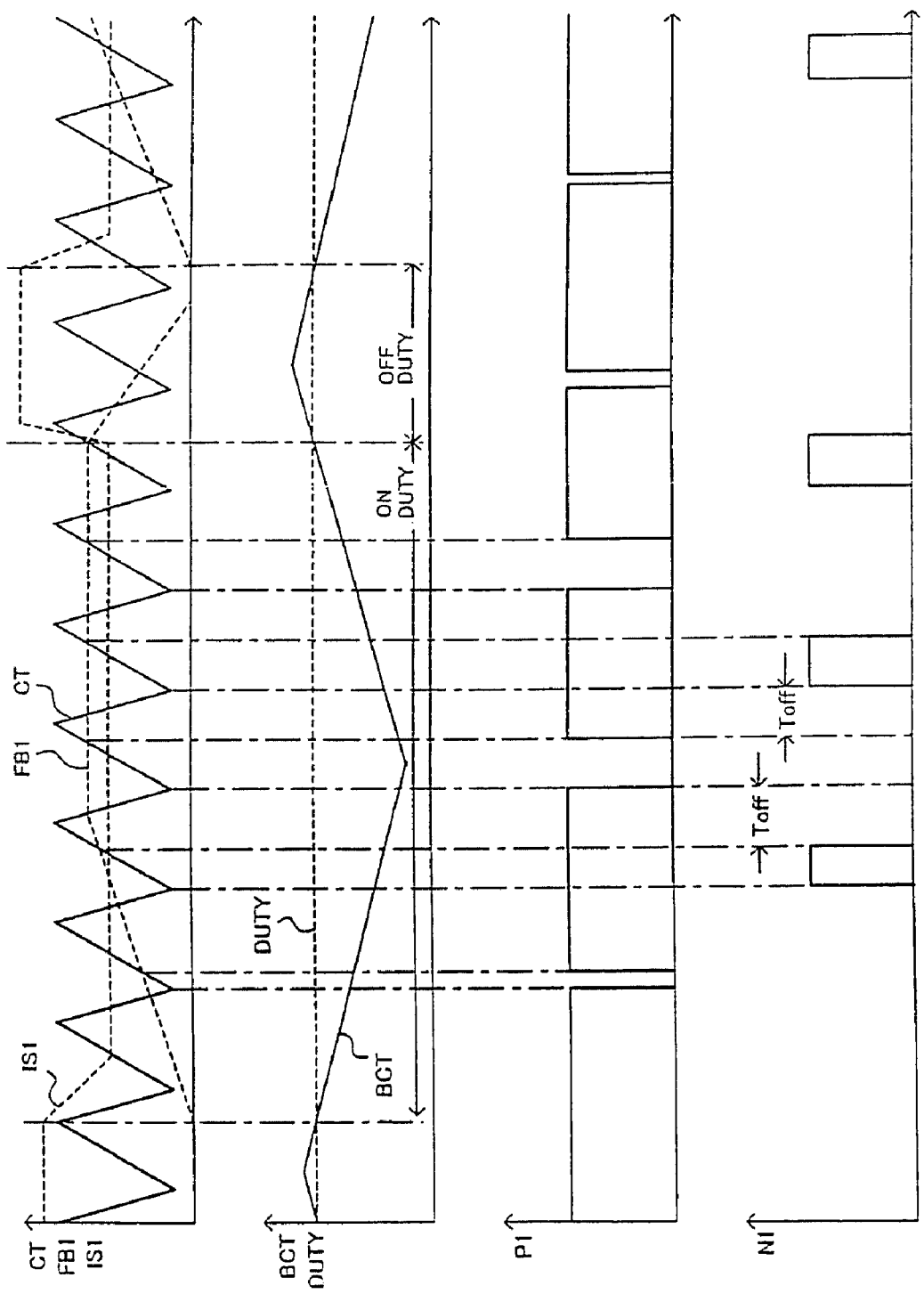
FIG. 9 is a timing diagram illustrating the operation of the inverter in accordance with the first embodiment.

FIGS. 9-11 illustrate the manner in which the first transformer system associated with the first transformer TR1 is controlled. It is noted that the internal structure, and hence the operation, of the IC 600 is substantially the same as that of IC 200 of the first embodiment (FIG. 2). Control of the second transformer system associated with the second transformer TR2 is carried out in a similar manner. Therefore, description of the operation of the second transformer system will be omitted.

Referring to FIG. 9, it is shown that the PWM control is performed during ON DUTY periods in which the duty signal DUTY exceeds the burst triangular signal BCT. On the other hand, during OFF DUTY periods in which the duty signal DUTY is below the burst triangular signal BCT, the PWM control is stopped to stop supplying power to the cold cathode fluorescent lights FL11 and FL12.

In this embodiment also, the triangular wave signal CT for performing PWM has a frequency of 100 kHZ for example and is controlled by the burst triangular signal BCT of 300 Hz for example that no visual problem will arise. By controlling the magnitude of the duty signal DUTY, it is possible to control the power supplied to (or the amount of light emitted by) the cold cathode fluorescent lights FL11-FL22 beyond the range of control that can be attained solely by the PWM.

Referring to the timing diagram of FIG. 9, the feedback voltage FB1 is limited to a low voltage while the duty signal DUTY is lower than the burst triangular signal BCT. Then, PWM control is not performed, so that the gate drive signal P1 has a high (H) level, and the gate drive signal N1 has a low (L) level. As a consequence, the PMOS 303 and NMOS 302 remain turned OFF that no electric power will be supplied to the transformer TR1.

Next, as the duty signal DUTY exceeds the burst triangular signal BCT, the feedback voltage FB1 is slowly raised to a prescribed feedback control voltage by the capacitor 508 connected between the ninth and tenth pins. As a result, gate drive signals P1 and N1 are outputted from the IC 600 to the PMOS 303 and NMOS 302 to perform PWM control of these semiconductor switches.

Details of the PWM control will now be described. The gate drive signals P1 and N1 are generated at the timing of establishing a simultaneous OFF period Toff in which both the PMOS 303 and NMOS 302 are turned off. Further, each of the gate drive signals P1 and N1 is generated at the timing of switching the direction of current that flows through the primary winding 308 of the transformer TR1 from the first direction to the second, or vise versa, at the moment when the current is nullified.

Next, referring to FIGS. 10 and 11, a logic for forming gate drive signals P1 and N1 for the PWM control will now be described in detail.

Based on a triangular wave signal CT for performing PWM and the feedback voltage FB1, the gate drive signal P1 for driving the PMOS 303 and the gate drive signal N1 for driving the NMOS 302 are generated at the timing of establishing a simultaneous OFF period Toff in which both the PMOS 303 and NMOS 302 are turned off. Furthermore, each of the gate drive signals P1 and N1 is generated at the timing of switching the direction of current that flows through the primary winding 308 of the transformer TR1 from one direction to the other at the moment when the current is nullified.

As shown in FIG. 10, during period i, the gate drive signal P1 and N1 have L level, so that the PMOS 303 is turned on, thereby allowing current to flow through the primary winding 308 in the first direction via the capacitor 304. This condition is shown in FIG. 11(*a*).

In period ii, the gate drive signal P1 is pulled up to H level but the gate drive signal N1 has L level, so that both the PMOS 303 and NMOS 302 are simultaneously turned OFF, establishing a simultaneous OFF period Toff. This prevents penetration current from flowing. During this period, due to the energy stored in the transformer TR1, current continues to flow in the first direction through the body diode of the NMOS 302 and the capacitor 304. In this case, the potential at the point marked @ is lower than the ground potential GND by a voltage that equals the voltage drop Vf across the body diode. The condition of the switch circuit during period ii is shown in FIG. 11(*b*).

In the later half of period ii, the current flowing in the first direction due to the energy stored in the transformer TR1 reduces to zero, when period iii begins. In period iii, no current flows as shown in FIG. 11(*c*), since both the PMOS 303 and NMOS 302 are turned off. It is noted that in period iii the potential at point @ is indeterminate. In this way, in the invention, a zero-current state is created prior to switching the direction of the current through the primary winding 308.

This zero-current state prior to switching the direction of the current can be attained by appropriately setting the pulse widths in the PWM in accordance with the electric requirements of the transformer TR1, resonance capacitors 311 and 315, and cold cathode fluorescent lights FL11 and FL12.

In period iv, both the gate drive signals P1 and N1 have high (H) level, so that the NMOS 302 is turned on to flow current through the primary winding 308 in the second direction. This condition is shown in FIG. 11(*d*).

In period v, the gate drive signal N1 is pulled down to low (L) and the gate drive signal P1 remains high (H), thereby establishing a simultaneous OFF period Toff in which both the PMOS 303 and NMOS 302 are simultaneously turned off. This prevents penetration current from flowing. During this period, current due to the energy stored in the transformer TR1 keeps on flowing in the second direction via the body diode of the PMOS 303 and the capacitor 301. In this case, the voltage at point @ is higher than the power supply voltage VCC by a voltage that equals the voltage drop Vf across the body diode. The condition during period v is shown in FIG. 11(*e*).

In the later half of period v, the current flowing in the second direction due to the energy stored in the transformer TR1 reduces to zero, when period vi begins. In this period vi, both the PMOS 303 and NMOS 302 are turned off as shown in FIG. 11(*f*), so that no current flows through the primary winding. In this period vi also, the potential at point @ is indeterminate. Thus, in the invention, a zero-current state is created prior to switching the direction of the current through the primary winding 308.

Thus, the first switch 303 is turned on at the point of time matched with every other apex of the triangular wave signal on one side of the signal and remains turned on until a triangular signal immediately after the turning on of the first switch becomes equal in magnitude to the error signal; the second switch 302 is turned on at every other apex that is on the same one side of, but is different from, the apices associated with the turning on of the first switch 303 the first switch 303, and remains turned on until a triangular signal that follows immediately after the turning on of the second switch becomes equal in magnitude to the feedback signal FB.

It should be understood that an NMOS switch can be used in place of the PMOS 303 as the first switch of FIG. 8. In that case, the gate drive signal be changed accordingly.

In the bust mode of the intermittent-operation control circuit of the second embodiment also, as in the first embodiment, the error signals FB1 an FB2 are set to substantially zero level during OFF DUTY periods of intermittent operation by the intermittent-operation control circuit based on the intermittent-operation signal (burst signal) BRT, and the error signals FB1 and FB2 are gradually increased upon transition from an OFF DUTY state to an ON DUTY state, and gradually decreased when the operation proceeds from an OFF DUTY state to an ON DUTY state.

Further description of the burst mode and the advantages of the second embodiment will be omitted, since they are substantially the same as those of the first embodiment.

INDUSTRIAL APPLICABILITY

An inverter, a controller IC for the inverter, and an electronic apparatus utilizing the inverter in accordance with the invention are suitable for use with a backlight source of a liquid crystal display (LCD) of a notebook type PC, a TV set, and of a vehicle navigation system.

The invention claimed is:

1. A DC-AC converter, comprising:
   a transformer having a primary winding and at least one secondary winding;
   a first and a second semiconductor switches connected in series via said primary winding for allowing current to flow from a DC power source through said primary winding in a first direction;
   a third and a fourth semiconductor switches connected in series via said primary winding for allowing current to flow from said DC power source through said primary winding in a second direction;
   a current detection circuit for detecting the current that flows through a load connected to said secondary winding to thereby generate a current detection signal;
   a triangular wave signal generation circuit for generating a triangular wave signal;
   a PWM control signal generation circuit for generating a PWM control signal by comparing said triangular wave signal with an error signal generated on the basis of said current detection signal;
   an intermittent-operation control circuit adapted to
      set said error signal to a substantially zero level during an OFF period of said intermittent operation,
      gradually increase the error signal upon transition from an OFF state to an ON state; and
      gradually decrease the error signal upon transition from an ON state to an OFF state, and
   a logic circuit that operates on the basis of said PWM control signal to generate
      a first switch signal for turning on said first semiconductor switch;
      a second switch signal for turning on said second semiconductor switch;
      a third switch signal for turning on said third semiconductor switch; and
      a fourth switch signal for turning on said fourth switch in such a way that
   a first simultaneously OFF period is established during which said first and fourth switches are simultaneously turned off, and a second simultaneously OFF period is established during which said third and second switches are simultaneously turned off, and that
   the direction of the current flowing through said primary winding is changed from one direction to the other when the magnitude of said current is zero.

2. The DC-AC converter according to claim 1, wherein said second switch is turned on at the point of time matched with every other apex of said triangular wave signal on one side thereof and remains turned on until a triangular signal that follows immediately after the turning on of said second switch becomes equal in magnitude to said error signal;
   said first switch is turned on a first predetermined time before said second switch is turned on and remains turned on until a triangular signal that follows immediately after the turning off of said second switch reaches its apex on the other side of said triangular wave signal;
   said fourth switch is turned on at the point of time matched with every other apex that is on the same side of, but is different from, said apices associated with the turning on of said second switch and remains turned on until a triangular signal that follows immediately after the turning on of said fourth switch becomes equal in magnitude to said error signal; and
   said third switch is turned on a second predetermined time before said fourth switch is turned on while said second switch is turned off and said first switch is turned on, and remains turned on until a triangular signal that follows immediately after the turning off of said fourth switch reaches its apex on the other side of said triangular wave signal.

3. A DC-AC converter, comprising:
   a transformer having a primary winding and at least one secondary winding;
   a first capacitor and a first semiconductor switch connected in series via said primary winding for allowing current to flow from a DC power source through said primary winding in a first direction;
   a second semiconductor switch and a second capacitor connected in series via said primary winding for allowing current to flow from said DC power source through said primary winding in a second direction;
   a current detection circuit for detecting the current that flows through a load connected to said secondary winding to thereby generate a current detection signal;
   a triangular wave signal generation circuit for generating a triangular wave signal;
   a PWM control signal generation circuit for generating a PWM control signal by comparing said triangular wave signal with an error signal generated on the basis of said current detection signal;
   an intermittent-operation control circuit adapted to
      set said error signal to a substantially zero level during OFF periods of the intermittent operation,
      gradually increase the error signal upon a transition from an OFF state to an ON state; and
      gradually decrease the error signal upon a transition from an ON state to an OFF state, and
   a logic circuit that operates on the basis of said PWM control signal to generate
      a first switch signal for turning on said first semiconductor switch and
      a second switch signal for turning on said second semiconductor switch in such a way that
   a simultaneously OFF period is established during which said first and second switches are simultaneously turned off, and
   the direction of the current flowing through said primary winding is changed from one direction to the other when the magnitude of said current is zero.

4. The DC-AC converter according to claim 3, wherein said first switch is turned on at the point of time matched with every other apex of said triangular wave signal on one side thereof and remains turned on until a triangular signal that follows immediately after the turning on of said first switch becomes equal in magnitude to said error signal; and said second switch is turned on at the point of time matched with every other apex that is on the same one side, but is different from, said apices associated with the turning on of said first switch, and remains turned on until a triangular signal that follows immediately after said turning on of said second switch becomes equal in magnitude to said error signal.

5. The DC-AC converter according to claim 1, wherein said PWM control signal generation circuit includes an error signal generation circuit for generating an error signal based on the difference between said current detection signal and a current reference signal, and a PWM comparator for comparing said triangular wave signal with said error signal to output a PWM control signal, and said intermittent-operation control circuit has an intermittent-operation control element that is connected to said error signal generation circuit and controllably turned on/off by said intermittent-operation signal in such a way that said error signal has a substantially zero level during off periods of said intermittent operation.

6. The DC-AC converter according to claim 5, wherein said error signal generation circuit generates said error signal based on the error output of an error amplifier that compares said current detection signal with said current reference signal, and said intermittent-operation control circuit sets said current detection signal to a predetermined level to reduce said error signal to a substantially zero level.

7. The DC-AC converter according to claim 6, wherein a capacitor is connected between the output end of said error signal generation circuit and the current detection signal input end of said error amplifier, and said capacitor is discharged upon transition from an ON state to an OFF state of said intermittent-operation signal to reduce said error signal towards zero level, and charged upon transition from an OFF state to an ON state of said intermittent-operation signal to increase the level of said error signal.

8. A control IC for supplying AC power to a load connected to a secondary winding of a transformer by driving a switch circuit that includes: a first and a second semiconductor switches connected in series via said primary winding of said transformer to cause current to flow from a DC power source through said primary winding in a first direction; and a third and a fourth semiconductor switches connected in series via said primary winding to cause current to flow from said DC power source through said primary winding in a second direction, said control IC comprising:

a triangular wave signal generation circuit for generating a triangular wave signal;

a PWM control signal generation circuit for generating a PWM control signal by comparing said triangular wave signal with an error signal formed on the basis of a current detection signal for the current flowing through said load;

an intermittent-operation control circuit adapted to
set said error signal to a substantially zero level during an OFF period of said intermittent operation,
gradually increase said error signal upon transition from an OFF state to an ON state, and
gradually decrease said error signal upon transition from an ON state to an OFF state; and a switch signal generation logic circuit that operates on the basis of said PWM control signal to generate a first, a second, a third, and a fourth switch signals for respectively turning on said first, second, third, and fourth semiconductor switches, in such a way that a first simultaneously OFF period is established during which said first and fourth switches are simultaneously turned off and a second simultaneously OFF period is established during which said third and second switches are simultaneously turned off, and that the direction of the current flowing through said primary winding is switched from one direction to the other when the magnitude of the current is zero.

9. The controller IC according to claim 8, wherein said second switch is turned on at the point of time matched with every other apex of said triangular wave signal on one side thereof and remains turned on until a triangular signal that follows immediately after the turning on of said second switch becomes equal in magnitude to said error signal;

said first switch is turned on a first predetermined time before said second switch is turned on and remains turned on until a triangular signal that follows immediately after the turning off of said second switch reaches its apex on the other side of said triangular wave signal;

said fourth switch is turned on at the point of time matched with every other apex that is on the same side of, but is different from, said apices associated with the turning on of said second switch and remains turned on until a triangular signal that follows immediately after the turning on of said fourth switch becomes equal in magnitude to said error signal; and said third switch is turned on a second predetermined time before said fourth switch is turned on while said second switch is turned off and said first switch is turned on, and remains turned on until a triangular signal that follows immediately after the turning off of said fourth switch reaches its apex on the other side of said triangular wave signal.

10. A controller IC for supplying AC power to a load connected to a secondary winding of a transformer by driving a switch circuit that includes: a first capacitor and a first semiconductor switch connected in series via said primary winding of said transformer to cause current to flow current from a DC power source through said primary winding in a first direction; and a second semiconductor switch and a second capacitor connected in series via said primary winding to cause current to flow from said DC power source through said primary winding in a second direction, said control IC comprising:

a triangular wave signal generation circuit for generating a triangular wave signal;

a PWM control signal generation circuit for generating a PWM control signal by comparing said triangular wave signal with an error signal formed on the basis of a current detection signal for the current flowing through said load;

an intermittent-operation control circuit adapted to
set said error signal to a substantially zero level during an OFF period of the intermittent operation,
gradually increase said error signal upon transition from an OFF state to an ON state, and
gradually decrease said error signal upon transition from an ON state to an OFF state; and a switch signal generation logic circuit that operates on the basis of said PWM control signal to generate a first switch signal for turning on said first semiconductor switch and a second switch signal for turning on said second semiconductor switch in such a way that a simultaneously OFF period is established during which said first and second switches are simultaneously turned off and that the direction of the current flowing through said primary winding is switched from one direction to the other when the magnitude of said current is zero.

11. The DC-AC converter according to claim 10, wherein
said first switch is turned on at the point of time matched with every other apex of said triangular wave signal on one side thereof and remains turned on until a triangular signal that follows immediately after the turning on of said first switch becomes equal in magnitude to said error signal; and
said second switch is turned on at the point of time matched with every other apex that is on the same one side of, but is different from, said apices associated with the turning on of said first switch, and remains turned on until a triangular signal that follows immediately after said turning on of said second switch becomes equal in magnitude to said error signal.

12. The controller IC according to claim 8, wherein
said PWM control signal generation circuit includes
an error signal generation circuit for generating an error signal based on the difference between said current detection signal and a current reference signal, and
a PWM comparator for comparing said triangular wave signal with said error signal to output a PWM control signal, and
said intermittent-operation control circuit has an intermittent-operation control element that is connected to said error signal generation circuit and controllably turned on/off by said intermittent-operation signal in such a way that said error signal has a substantially zero level during off periods of said intermittent operation.

13. The DC-AC converter according to claim 12, wherein
said error signal generation circuit generates said error signal based on the error output of an error amplifier that compares said current detection signal with said current reference signal, and
said intermittent-operation control circuit sets said current detection signal to a predetermined level to reduce said error signal to a substantially zero level.

14. The DC-AC converter according to claim 13, wherein
a capacitor is connected between the output end of said error signal generation circuit and the current detection signal input end of said error amplifier, and
said capacitor is discharged upon transition from an ON state to an OFF state of said intermittent-operation signal to reduce said error signal towards zero level, and charged upon transition from an OFF state to an ON state of said intermittent-operation signal to increase the level of said error signal.

15. An electronic apparatus, comprising:
a DC power source;
a DC-AC converter connected to said DC power source for outputting an AC power according to claim 1, and
a light emitting device driven by the AC power outputted from said DC-AC converter.

16. The electronic apparatus according to claim 15, wherein said light emitting device is a CCFL.

* * * * *